(12) United States Patent
Lee

(10) Patent No.: US 8,121,658 B2
(45) Date of Patent: Feb. 21, 2012

(54) TORSION SPRING, ELASTIC DEVICE AND SLIDING APPARATUS AND PORTABLE APPLIANCE UTILIZING THE DEVICE

(75) Inventor: Han Sang Lee, Seoul (KR)

(73) Assignees: P & Tel Inc., Seoul (KR); Han Sang Lee, Seoul (KR)

(*) Notice: Subject to any disclaimer, the term of this patent is extended or adjusted under 35 U.S.C. 154(b) by 1175 days.

(21) Appl. No.: 11/774,314

(22) Filed: Jul. 6, 2007

(65) Prior Publication Data

US 2008/0007870 A1 Jan. 10, 2008

(30) Foreign Application Priority Data

Jul. 7, 2006 (KR) .................. 10-2006-0063684

(51) Int. Cl.
*H04M 1/00* (2006.01)
(52) U.S. Cl. ............... 455/575.4; 455/575.1; 455/575.3; 267/160
(58) Field of Classification Search ............... 455/575.1, 455/575.3, 575.4; 267/81, 70, 73, 467, 160, 267/140.5, 158, 150, 140.12, 179, 199; 361/727; 188/378, 379; 416/134 A, 500
See application file for complete search history.

(56) References Cited

U.S. PATENT DOCUMENTS

| | | | | |
|---|---|---|---|---|
| 7,231,039 B2* | 6/2007 | Gronroos et al. | ........ | 379/428.02 |
| 7,247,048 B2* | 7/2007 | Yokoyama | ........ | 439/500 |
| 2005/0113154 A1* | 5/2005 | Park et al. | ........ | 455/575.4 |
| 2006/0073858 A1 | 4/2006 | Nagashima | | |
| 2006/0178176 A1* | 8/2006 | Kwak et al. | ........ | 455/575.4 |
| 2006/0211460 A1* | 9/2006 | Jeong et al. | ........ | 455/575.4 |
| 2006/0223596 A1* | 10/2006 | Hur | ........ | 455/575.4 |
| 2006/0226151 A1* | 10/2006 | Pan | ........ | 220/345.1 |
| 2006/0243845 A1* | 11/2006 | Wegner | ........ | 242/378.1 |
| 2007/0243912 A1* | 10/2007 | Lee et al. | ........ | 455/575.4 |

FOREIGN PATENT DOCUMENTS

| | | |
|---|---|---|
| DE | 296 10 236 U1 | 10/1996 |
| JP | 10-133007 A | 5/1998 |
| JP | 2006-108881 A | 4/2006 |
| JP | 2007-166216 A | 6/2007 |
| KR | 20-0361808 Y1 | 9/2004 |
| KR | 10-2005-0089106 A | 9/2005 |
| KR | 10-2005-0118908 A | 12/2005 |
| KR | 10-2006-0001898 A | 1/2006 |
| KR | 20-0411611 Y1 | 3/2006 |
| KR | 10-2006-0029496 A | 4/2006 |
| KR | 20-0417355 Y1 | 5/2006 |

* cited by examiner

*Primary Examiner* — Dominic E Rego
(74) *Attorney, Agent, or Firm* — Roberts Mlotkowski Safran & Cole, P.C.

(57) ABSTRACT

Disclosed is an elastic device which is suitable for a sliding opening/closing apparatus of a portable appliance. The elastic device includes a first torsion spring including a first spiral part which is wound as a spiral shape without a vertical overlapping portion and a first extension arm extending from an outer portion of the first spiral part; a second torsion spring including a second spiral part which is wound as a spiral shape without a vertical overlapping portion thereof and a second extension arm extending from an outer portion of the second spiral part. The elastic device also includes a connection member connecting one of both ends of the first torsion spring and one of both ends of the second torsion spring with each other. The elastic device may have a smaller thickness in comparison with that of a conventional torsion spring having a vertical overlapping portion thereof.

26 Claims, 32 Drawing Sheets

TORSION SPRING, ELASTIC DEVICE AND SLIDING APPARATUS AND PORTABLE APPLIANCE UTILIZING THE DEVICE

BACKGROUND OF THE INVENTION

1. Field of the Invention

The present invention relates to a torsion spring, an elastic device, and a sliding opening/closing apparatus and a portable appliance using the device, and more particularly to a torsion spring and an elastic device which are suitable for a sliding opening/closing apparatus of a portable appliance such as wireless phone, a PDA, and a PMP, etc. and a sliding opening/closing apparatus and a portable appliance using the same.

2. Description of the Prior Art

As consumers prefer apparatuses having a smaller thickness, it has been a problem in portable appliances to reduce thickness thereof.

FIG. 1 is a plain view illustrating a conventional sliding opening/closing apparatus, and FIG. 1 is an enlarged front view of a conventional torsion spring.

As shown, the sliding opening/closing apparatus 10 includes a guide member 12 having a guide part 11 formed therein, a slide member 16 movably installed in the guide member 12, and a torsion spring 20 rotatably assembled between the guide member 12 and the slide member 16. The torsion spring 20 is contracted while rotating depending on if the slide member 16 is moved along the guide part 11 by external force. Meanwhile, when the external force is removed, the torsion spring 20 is expanded while rotating so as to push the slide member 16 toward a longitudinal direction of the guide part 11.

As shown in FIGS. 1 and 2, a conventional torsion spring 20 is made in an integrally shape by winding a part of a spring wire 22 having a large amount of elastic force such as a steel wire, or by winding the part of a spring wire 22 while making a spiral shape thereof. The conventional torsion spring 20 includes a spiral part 24 formed by winding the spring wire 22 in a circular-shape or a spiral shape and a extension arm 26 extending toward an exterior of the spiral. A typical spring wire used for the torsion spring 20 of the sliding opening/closing apparatus 10 usually has a diameter thereof of 0.5 mm. So as to reduce thickness of the sliding opening/closing apparatus 10, a spring wire 22 having a diameter of 0.45 mm may also be used. When the torsion spring is made of a spring wire 22 having a diameter smaller than 0.45 mm, the amount of torsion moment which can push the slide member 16 decreases, and the torsion spring also tends while being inverted due to a vertical overlapping portion thereof. In this case, the torsion spring 20 generates a large amount of frictional force against the guide member 12 or the slide member 16 while rotating, thereby making it difficult to assemble. Such a torsion spring 20 can not be used in the sliding opening/closing apparatus 10.

Particularly, in the conventional torsion spring 10, the extension arm 26 is arranged in such a manner that the extension arm 26 is slanted from the spiral part 24 to the exterior of the spiral part 24 due to a vertical overlapping portion thereof. Because of this, when the extension arm 26 is rotated, one side portion of the spiral part 24 is naturally left. Because of this reason, an interval more than two times the diameter of the spring wire 22 is needed between the guide member 12 and the slide member 16. An interval as a space for typical operation needs to have a height as much as three times the diameter of the spring wire 22. This is an obstacle to reduce a thickness of a finished product such as a slide opening/closing apparatus 10 or a portable phone in which a slide opening/closing apparatus is installed.

Generally, an interval between the guide member 12 and the slide member 16 is kept to be a little more than two times the diameter of the spring wire 22 by considering the smoothly rational operation of the torsion spring 20. For example, if the diameter of the spring wire 22 is 0.5 mm, the interval between the guide member 12 and the slide member 16 has to be at least 1.5 mm.

Also, in the conventional torsion spring as shown in FIGS. 1 and 2, since the extension arm 26 extending from the spiral part is inevitably located out of the spiral part, it is difficult to wind up the torsion spring many times. If winding times decreases, dispersion of stress and elastic force caused by torsion moment of the spiral part are also reduced.

SUMMARY OF THE INVENTION

Accordingly, the present invention has been made to solve the above-mentioned problems occurring in the prior art, and the present invention provides an elastic device, which can reduce the thickness of a torsion spring thereof in comparison with that of a conventional spring.

Also, the present invention provides an elastic device which can disperse stress and can increase elastic force caused by torsion moment of a torsion spring.

Also, the present invention provides an elastic device which can prevent a used spring wire from being inverted due to vertical overlapping when a diameter of the spring wire is reduced.

Also, the present invention provides an elastic device which can adjust the amount of elastic force caused by torsion moment by means of the same torsion spring.

Also, the present invention provides a sliding opening/closing apparatus which can have a thickness thereof smaller than a conventional sliding opening/closing apparatus.

Also, the present invention provides a sliding opening/closing apparatus which can employ a spring wire having a diameter thereof relatively smaller than a diameter of a conventional spring wire.

Also, the present invention provides a portable appliance which can have a reduced thickness thereof by employing an elastic device according to the present invention.

Also, the present invention provides a torsion spring used for assembling an elastic device according to the present invention.

In accordance with an aspect of the present invention, there is provided an elastic device including: a torsion spring having a spiral part wound while making a spiral shape without a vertical overlapping portion of the spiral part; an arm member connected with one or the other end of the torsion spring, the arm member changing a degree of winding of the spiral part depending on a rotational angle respective to the torsion spring and being provided with elastic force caused by torsion moment corresponding to the degree of winding of the spiral part.

A pair of elastic devices can be connected with each other through arm members in such a manner that elastic devices can be rotated at a predetermined angle.

It is preferable that the torsion spring has a first spiral part and a second arm member which are wound while making a spiral shape without a vertical overlapping portion, in which the first arm member and the second arm member being integrally formed in such a manner of each outer end of the first arm member and the second arm member being connected with each other, and has a first arm member connected with an inner end of the first spiral part and a second arm member connected with an inner end of the second spiral part.

A connection member supporting one end of the first arm member connected with an inner end of the first spiral part and one end the second arm member connected with an inner end of the second spiral part so that the one end of the first arm member and the one end the second arm member can be rotated, the connection member connecting the first arm member and the second arm member with each other.

The arm member having a first spiral part wound while making a spiral shape without a vertical overlapping portion, and a second spiral part wound while making a spiral shape without a vertical overlapping portion, the second arm member being separated from the first spiral part and arranged side by side with the first spiral part on an equal plan, the arm member has a first are member connected with one end of the first spiral part and a second are member connected with one end of the second spiral part, the elastic device further comprises a connection member supporting one end of the first arm member connected with the first spiral part and one end the second are member connected with the second spiral part so that the one end of the first are member and the one end the second are member can be rotated, the connection member connecting the first arm member and the second arm member with each other, the other end of the first spiral part and the other end of the second spiral part can be held by the connection member.

The connection member preferably has a first stopper and a second stopper for limiting rotational range of the first arm member and the second arm member, wherein the first arm member and the second arm member have a first latching jaw and a second latching jaw, respectively, which are locked into the stoppers so that rotational ranges of the first latching jaw and the second latching jaw are limited.

The connection member preferably includes a torsion spring-seating recess having a first spiral part-seating recess for receiving the first spiral part and a second spiral part-seating recess for receiving the second spiral part.

As the case may be, the first arm member preferably has a first spiral part-seating recess for receiving the first spiral part and a second spiral part-seating recess for receiving the second spiral part.

The torsion spring may be made of a spring wire having a thickness-reduction part, the spring wire having a width larger than a thickness through a vertical pressing, cutting, or drawing.

Multiple torsion springs may be installed side by side in the arm member at an interval, the arm member has a seating recess which receives a connecting portion where the torsion spring is connected so as to support it, and allows the arm member to be rotated.

It is preferable that the first spiral part and the second spiral part have thickness different from each other.

The arm member or a connection member is preferably a sheet member having a thickness thereof below two times the thickness of the torsion spring It is preferable that The arm member has a first sheet member and a second sheet member facing each other while having an interval having one end of the torsion spring between the first sheet member and the second sheet member, a gap formed at one of the first sheet member and the second sheet member, one end of the torsion spring being able to be inserted into the gap, and a torsion spring connecting protrusion is formed at both sides of the gap in such a manner that the torsion spring connecting protrusion is pressed toward an interior to protrude, one end or the other end of the torsion spring is engaged with the gap so as to be connected with the arm member.

A first sheet member and a second sheet member are assembled with each other while facing each other and having one end of the torsion spring between the first sheet member and the second sheet member, wherein a first rim is formed at the first sheet member in periphery of at least both sides of the first sheet member along a longitudinal direction of the arm member, among whole periphery of the first sheet member, except for periphery for allowing the torsion spring to be rotated, the first rim being curved toward the second sheet member, coupling protuberances being formed at an interval on the first rim, wherein a second rim is formed at the second sheet member in periphery of at least both sides of the second sheet member along a longitudinal direction of the arm member, among periphery of the second sheet member, except for periphery for allowing the torsion spring to be rotated, the second rim being curved toward the first sheet member, coupling grooves being formed at an interval on a lower part of periphery of the second rim, the coupling protuberances being curved and engaged with the coupling grooves so as to enable the first sheet member and the second sheet member not to separated from each other.

The torsion spring connection protrusion may be formed at both the first sheet member and the second sheet members.

In this case a torsion spring coupling protrusion in one side protrudes, at a high degree, and a torsion spring coupling protrusion in the other side protrudes at a low degree.

A first torsion spring having a first spiral part wound toward an inner direction while making a spiral shape without a vertical overlapping portion and a first extension arm extending from an outer portion of the first spiral part; a second torsion spring having a second spiral part wound while making a spiral shape without a vertical overlapping portion, the second spiral part being arranged side by side with the first spiral part on an equal plan, and a second extension arm extending from an outer portion of the second spiral part; and a connection member connecting one of both ends of the first torsion spring and one of both ends of the second torsion spring with each other. The connection member is connected with an inner end inside of a spiral of the first spiral part and with an inner end inside of a spiral of the second spiral part, respectively.

The connection member may be connected with the inner end of the first spiral part and the inner end of the second spiral part, respectively.

It is preferable that the connection member includes the first sheet member and the second sheet member which are assembled with each other while facing each other at an interval and having one end of the first torsion spring and one end of the second torsion spring between the first sheet member and the second sheet member, wherein a gap formed at one of the first sheet member and the second sheet member, one end of the first torsion spring and one end of the second torsion spring being able to be inserted into the gap, and a torsion spring connecting protrusion is formed at both sides of the gap in such a manner that the torsion spring connecting protrusion is pressed toward an interior to protrude, one end or the other end of the first torsion spring and one end or the other end of the second torsion spring are engaged with the gap so as to be connected with the connection member.

It is preferable that the connection member includes the first sheet member and the second sheet member which are assembled with each other while facing each other at an interval and having one end of the first torsion spring and one end of the second torsion spring between the first sheet member and the second sheet member, a first rim is formed at the first sheet member in periphery of at least both sides of the first sheet member along a longitudinal direction of the arm member, among whole periphery of the first sheet member except for periphery for allowing the first torsion spring and the second torsion spring to be rotated, the first rim being curved toward the second sheet member, coupling protuberances being formed at an interval on the first rim, a second rim is formed at the second sheet member in periphery of at least both sides of the second sheet member along a longitudinal direction of the arm member, among whole periphery of the second sheet member except for periphery for allowing the first torsion spring and the second torsion spring to be rotated, the second rim being curved toward the first sheet member, coupling grooves being formed at an interval on a lower part of periphery of the second rim, the coupling protuberances being curved and engaged with the coupling grooves so as to enable the first sheet member and the second sheet member not to separated from each other.

The torsion spring connection protrusion may be formed at both the first sheet member and the second sheet members.

It is more preferable that pressed protrusions are formed at a position of the first sheet member or the second sheet member in which the first torsion spring and the second torsion springs are connected with each other, the pressed protrusions protruding toward each other and increasing strength of the connection member and stability of connection of the two sheet members.

The connection member preferably includes a torsion spring-seating recess for receiving the first spiral part and a second spiral part-seating recess for receiving the second spiral part.

As the case may be, the connection member can be connected with an end of the first spiral part and an end of the second spiral part, respectively.

As the case may be, the connection member can be connected with an end of the first spiral part and an inner end of the second spiral part, respectively.

A spiral part can be further formed in at least one of the first extension arm and an end of the second extension arm, the spiral part being wound toward an interior of the spiral part without a vertical overlapping portion of the spiral part.

A cover assembled with an upper surface of the connection member can be included, and the connection member preferably has a thickness below two times thickness of the first torsion spring.

A thickness of the first torsion spring and a thickness of the second torsion spring can be different from each other.

It is preferable that connection recesses are formed at portions of the connection member, the first torsion spring being connected with the second torsion spring at the portions, the connection recesses receiving each connecting portion of the first torsion spring and the second torsion spring so as to support the first torsion spring and the second torsion spring, wherein a stopper is formed at each exposed portion of connection recesses, a stopper allowing the first extension arm and the second extension arm to extend to an exterior and limiting rotational angle of the first extension arm and the second extension arm.

A sliding opening/closing apparatus according to the present invention including: a slide member having a guide part; a guide member installed in such a manner as to move along the guide member; and the elastic device arranged between the guide member and the slide member, the elastic device having one end rotatably connected with the guide member and the other end rotatably connected with the slide member so that the elastic device provides elastic force caused by torsion moment, the slide member being push in a first direction or a second direction of the guide member by the torsion moment, according to a position of the slide member respective to the guide member.

A portable appliance, according to the present invention, having a sliding opening/closing mechanism, which includes: a slide member having a guide part; a guide member installed in such a manner as to move along the guide member; and the elastic device as claimed in claim 26, which is arranged between the guide member and the slide member, the elastic device having one end rotatably connected with the guide member and the other end rotatably connected with the slide member so that the elastic device provides elastic force caused by torsion moment, the slide member being push in a first direction or a second direction of the guide member by the torsion moment, according to a position of the slide member respective to the guide member, the slide member being moved caused by external force pushing up and drawing down the slide member.

A torsion spring according to the present invention, which includes a first spiral part wound while making a spiral shape without a vertical overlapping portion, the first spiral part having one end arranged at an inner portion of the first spiral part; and a second spiral part wound at an outer extension part of the first spiral part while making a spiral shape without a vertical overlapping portion, the second spiral part having one end arranged at an inner portion of the second spiral part.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, an exemplary embodiment of the present invention will be described with reference to the accompanying drawings.

Figure 1:
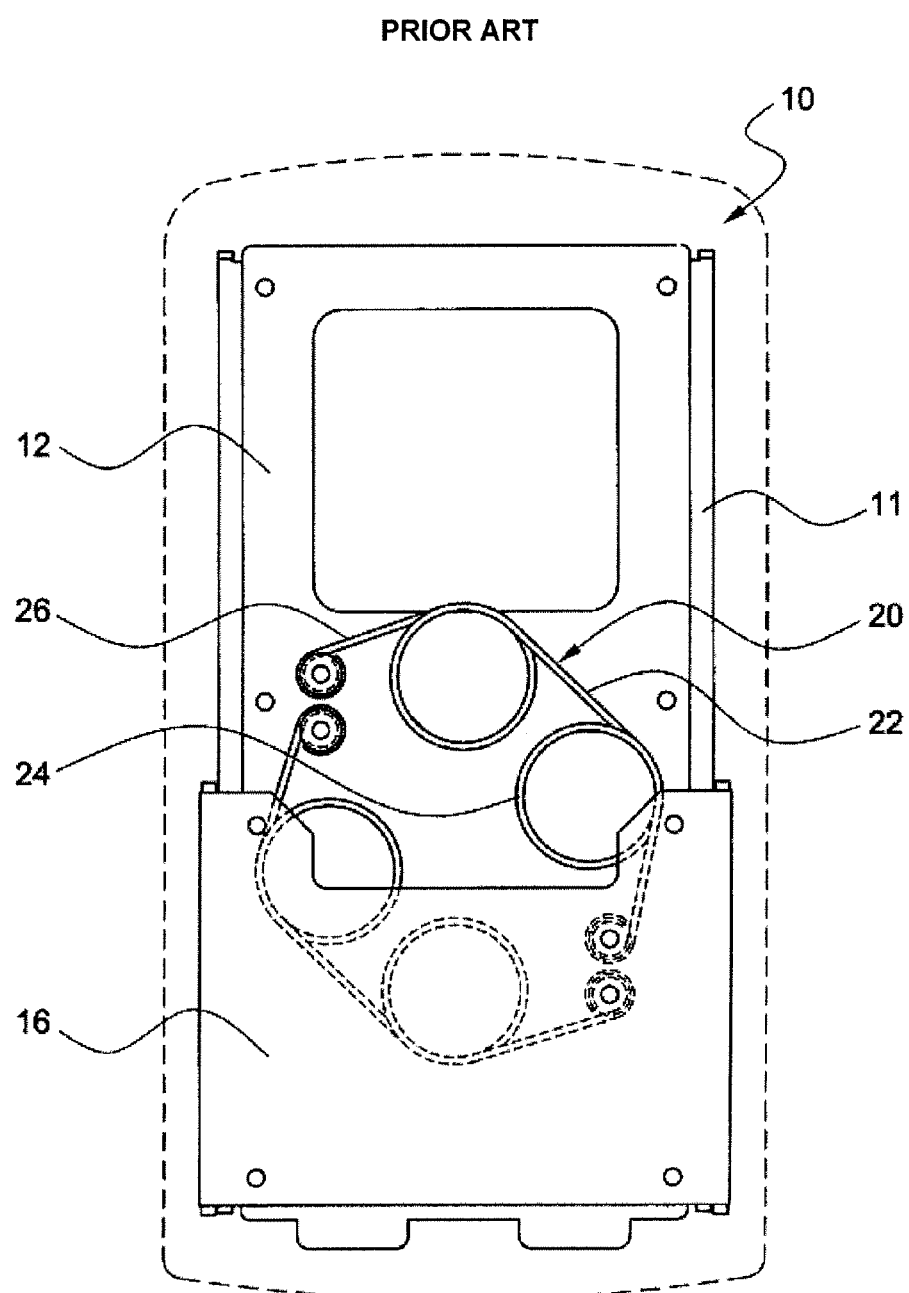
FIG. 1 is a plan view illustrating a conventional sliding opening/closing apparatus.
Figure 2:
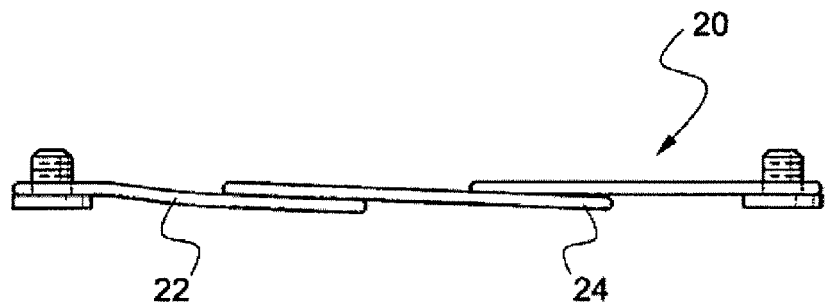
FIG. 2 is an enlarged front view of a conventional torsion spring.
Figure 3:
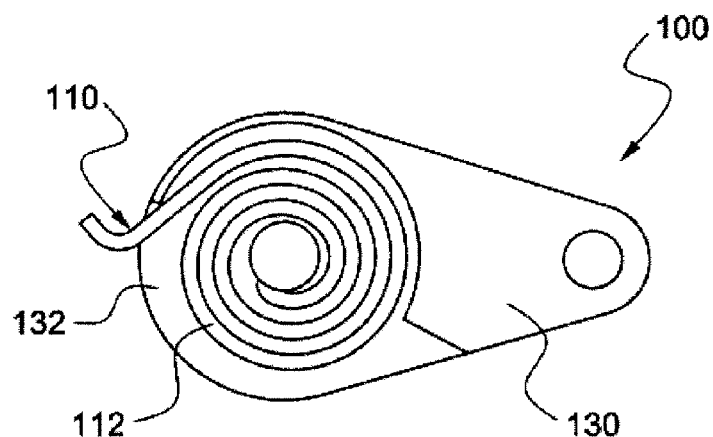
FIG. 3 is a plan view illustrating one embodiment of an elastic device according to the present invention.
Figure 4:
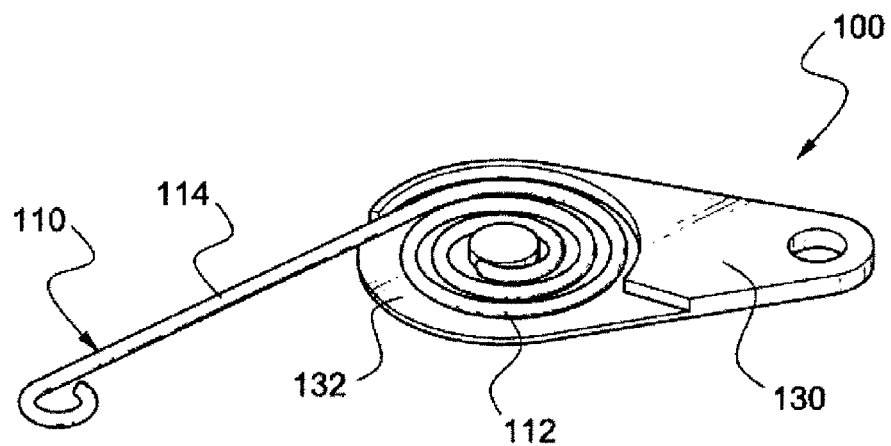
FIGS. 4 and 5 are perspective views illustrating a modified embodiment of the elastic device shown in FIG. 3.
Figure 5:
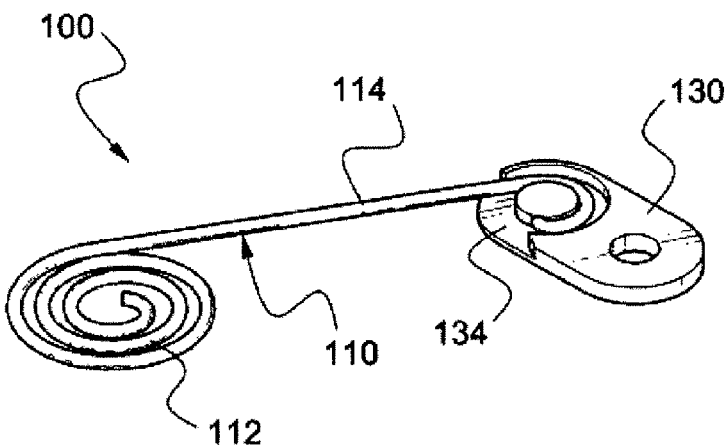

FIG. 3 is a plan view illustrating one embodiment of an elastic device according to the present invention, and FIGS. 4 and 5 are perspective views illustrating modified embodiment of the elastic device shown in FIG. 3, respectively.

As shown in the drawings, the elastic device 100 according to the present invention includes a torsion spring 110 having a spiral part 112 wound while making a spiral shape without a vertical overlapping portion. The spiral part 112 is wound at least one time. The spiral part 112 is preferably wound one and a half times, and more preferably wound more than two times.

The torsion spring 110 can be constructed without an extension arm as shown in FIG. 3, and can be constructed as a configuration having an extension arm 114 as shown in FIGS. 4 and 5.

The elastic device 100 according to the present invention includes an arm member 130. This arm member 130 has one side thereof connecting with one end of the torsion spring 110. The arm member 130 changes the degree of winding of the spiral part 112 depending on a rotational angle respective to the torsion spring 110, and is provided with elastic force in a rotational direction, which is caused by torsion moment corresponding to the degree of winding. Such an arm member 130 can be connected with one end of the torsion spring 110 positioned at an interior of the spiral part 112 as shown in FIGS. 3 and 4, and can be also connected with one end of an extension arm 114 of the torsion spring 110 as shown in FIG. 5.

Although it is difficult for the elastic device 100 as shown in FIG. 3 being used in a sliding opening/closing apparatus having a long sliding distance, the elastic device 100 can be used in a sliding opening/closing apparatus having a short sliding distance and providing sliding force in one direction. Furthermore, the elastic device 100 is also used as a component of an apparatus, for example, a rotation slide apparatus which is installed between two members, so as to provide rotational force in one direction.

In the elastic device 100 shown in FIGS. 4 and 5, the length of the extension arm 114 of the torsion spring 110 and the length of the arm member 130 can be adjusted depending on necessity.

A plastic plate or a metal plate, which has a thickness thereof smaller than a thickness of the torsion spring 110, may be used as the arm member 130. If possible, such a member preferably has a thickness thereof less than two times the thickness of the torsion spring 110, and more preferably, has a thickness thereof less than one and a half times thickness of the torsion spring 110. A connection member 150 which will be described later has a thickness similar to such a thickness. Since the arm member 130 has a large width thereof along a direction that the arm member 130 is forced, the thickness of the arm member 130 can be very small. The arm member 130 has the first spiral part-seating recess 132 or a extension arm-connecting recess 134 formed in a portion thereof at which the torsion spring 110 is positioned, which has a thickness similar to the thickness of the torsion spring 110. In this time, the thickness of a portion of the arm member 130, which is positioned at a lower part of the torsion spring 110, is smaller than the thickness of the torsion spring 110, and an upper surface of the torsion spring 110 is positioned equally to an elevation of a surface of a highest part the arm member 130. The arm member 130 can have a thickness less than two times the diameter of a spring wire used of the torsion spring 110. Accordingly, the elastic device 100 according to the present invention may be made in a thickness which is approximately equal to the thickness of the arm member 130.

Particularly, there is an advantage in that the elastic device 100 according to the present invention can have a thickness smaller than a conventional torsion spring having a vertical overlapping portion thereof. In a case of a thickness of an elastic device being no important, an elastic device having a thickness more than two times the thickness of the torsion spring 110 can be used.

Since the elastic device 100 according to the present invention has no overlapping portion of a spring wire, even though the torsion spring is made of a spring wire having a diameter below 0.45 mm, the torsion spring is not twisted due to a vertical overlapping portion thereof while being inverted. Particularly, there is an effect in that the elastic device 100 according to the present invention can be made of a spring wire having a diameter thereof respectively smaller than a conventional spring wire.

Such effects are applied to embodiments which will be described later, even though such effects will not be mentioned therein.

Figure 6:
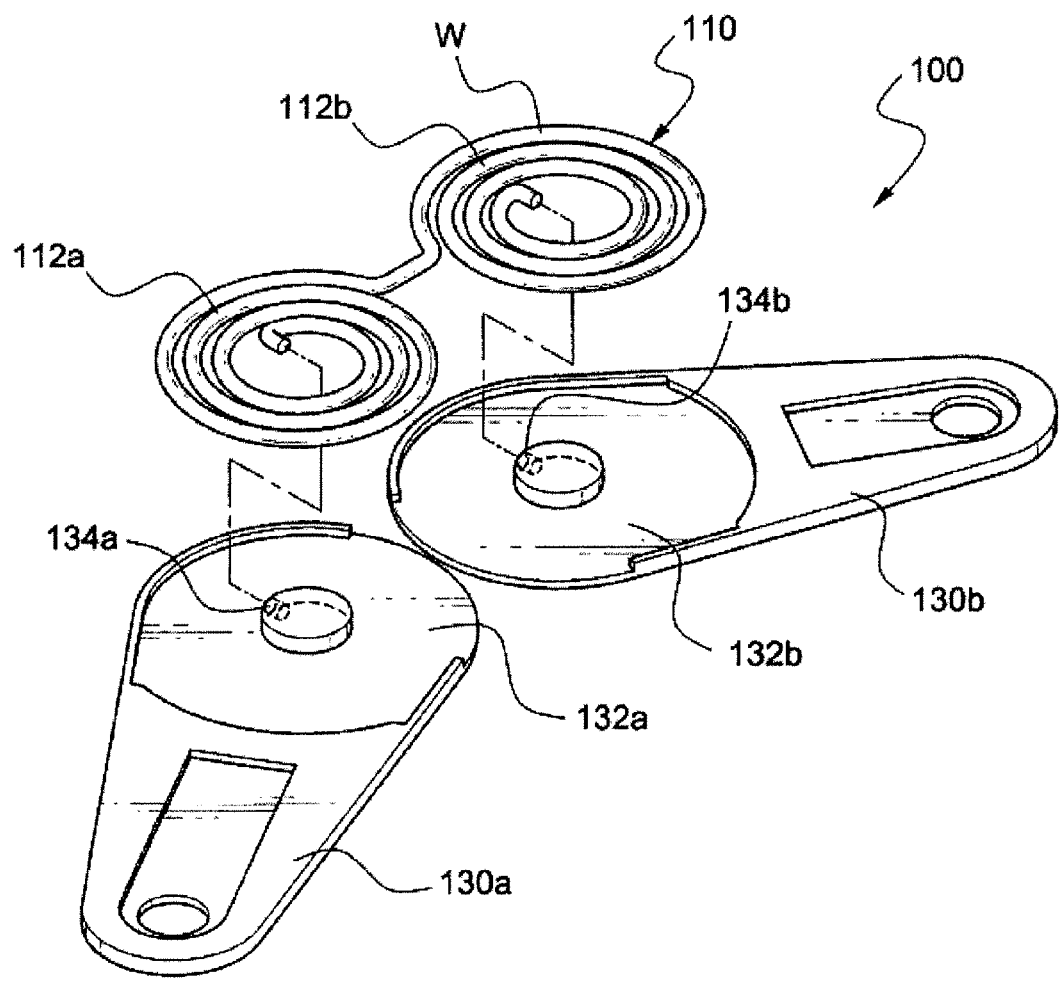
FIG. 6 is an exploded perspective view illustrating another embodiment of an elastic device according to the present invention.

FIG. 6 is an exploded perspective view illustrating another embodiment of an elastic device according to the present invention.

As the case may be, the torsion spring 110 may include the first spiral part 112a and the second spiral part 112b, which are integrally connected with each other, as shown in FIG. 6. Particularly, the torsion spring 110 has the first and second spiral parts 112a and 112b. The first spiral part 112a is wound while making a spiral shape without an overlapping portion thereof. The second spiral part 112b is formed at an opposite side of the first spiral part 112a to be connected with the first spiral part 112a, and is wound while making a spiral shape without a vertical overlapping portion thereof. The first spiral part 112a and the second spiral part 112b are integrally connected with each other.

AS shown in FIG. 6, one end of the torsion spring 110 is positioned at an interior of the first spiral part 112a, and the other end of the torsion spring 110 is positioned at an interior of the second spiral part 112b.

As shown, an inner end of the first spiral part 112a is connected with the first arm member 130a, and an inner end of the second spiral part 112b is connected with the second arm member 130b. Of course, the first arm member 130a has to have a holding part by which the inner end of the first spiral part 112a can be supported, and the second arm member 130b has to have a holding part by which the inner end of the second spiral part 112b can be supported. Most of the time, although a distance between a position where the first arm member 130a is connected with the torsion spring 110 and a position where the second arm member 130b is connected with the torsion spring 110 has to be longer than a distance between two free ends of both arm members 130a and 130b, depending on each case, later distance can be longer than the former distance oppositely so that an elastic device having such a structure can be used as a spring of a predetermined apparatus or as a component of an elastic body.

The first spiral part-seating recess 132a for receiving the first spiral part 112a is formed at a portion with which the first spiral part 112a is connected at the first arm member 130a. The second spiral part-seating recess 132b for receiving the second spiral part 112b is formed at a portion which the second spiral part 112b is connected at the second arm member 130b. Such first and second arm members 130a and 130b may have a thickness thereof much smaller than the thickness of the torsion spring 110. For example, when the torsion spring 110 is made of a spring wire of 0.5 mm, it is possible to use the first and second arm members 130a and 130b, which have a thickness thereof of about 0.2 mm~1.0 mm.

In a case of the arm member being made of sheet material having high strength, such as metal material without a spiral part-seating recess, material having a very small thickness such as 0.2 mm can used for the arm member. Of cause, in a case of a thickness of the arm member being not important, the arm member can have a thickness of more than two times the thickness of the torsion spring.

The torsion spring 110 of the elastic device 110 as shown in FIG. 6 doesn't also have a vertical overlapping portion thereof. Therefore, even through the torsion spring 110 is made of a spring wire (W), such a steel wire having a diameter less than 0.45 mm, a phenomenon that the torsion spring 110 tends to be inverted due to twisting thereof does not occurs. In this case, as a wire for a typical torsion spring, a wire having a diameter of 0.35 mm or 0.3 mm can be used for making the torsion spring 110 of the elastic device 100 according to the present invention.

Figure 7:
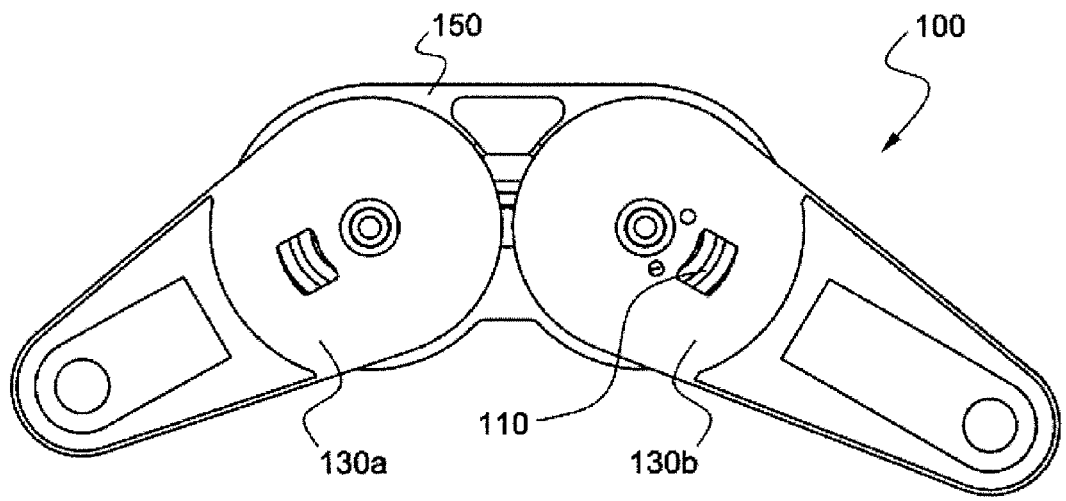
FIG. 7 is a plan view illustrating another embodiment of an elastic device according to the present invention.
Figure 8:
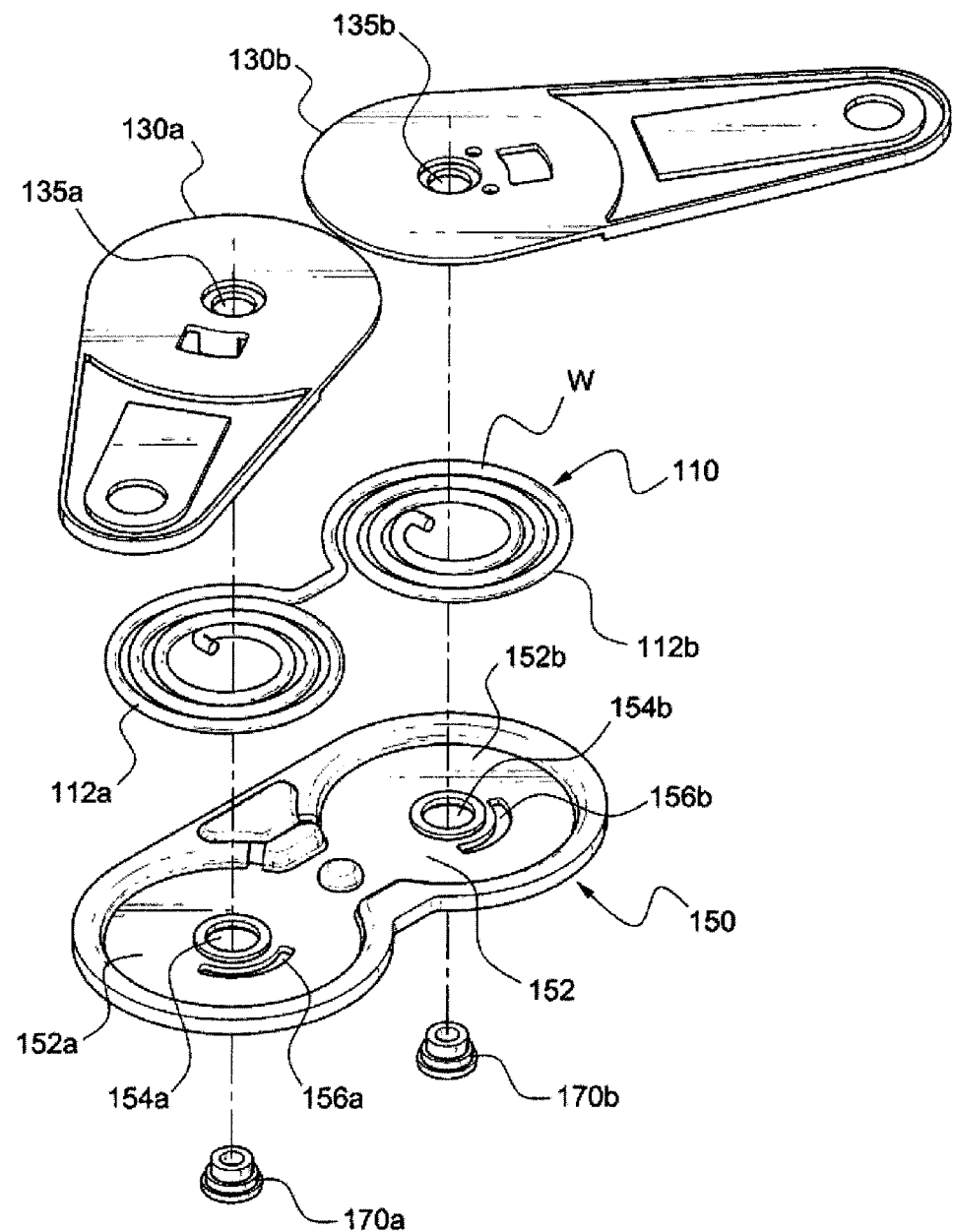
FIG. 8 is an exploded perspective view of the elastic device shown in FIG. 7.
Figure 9:
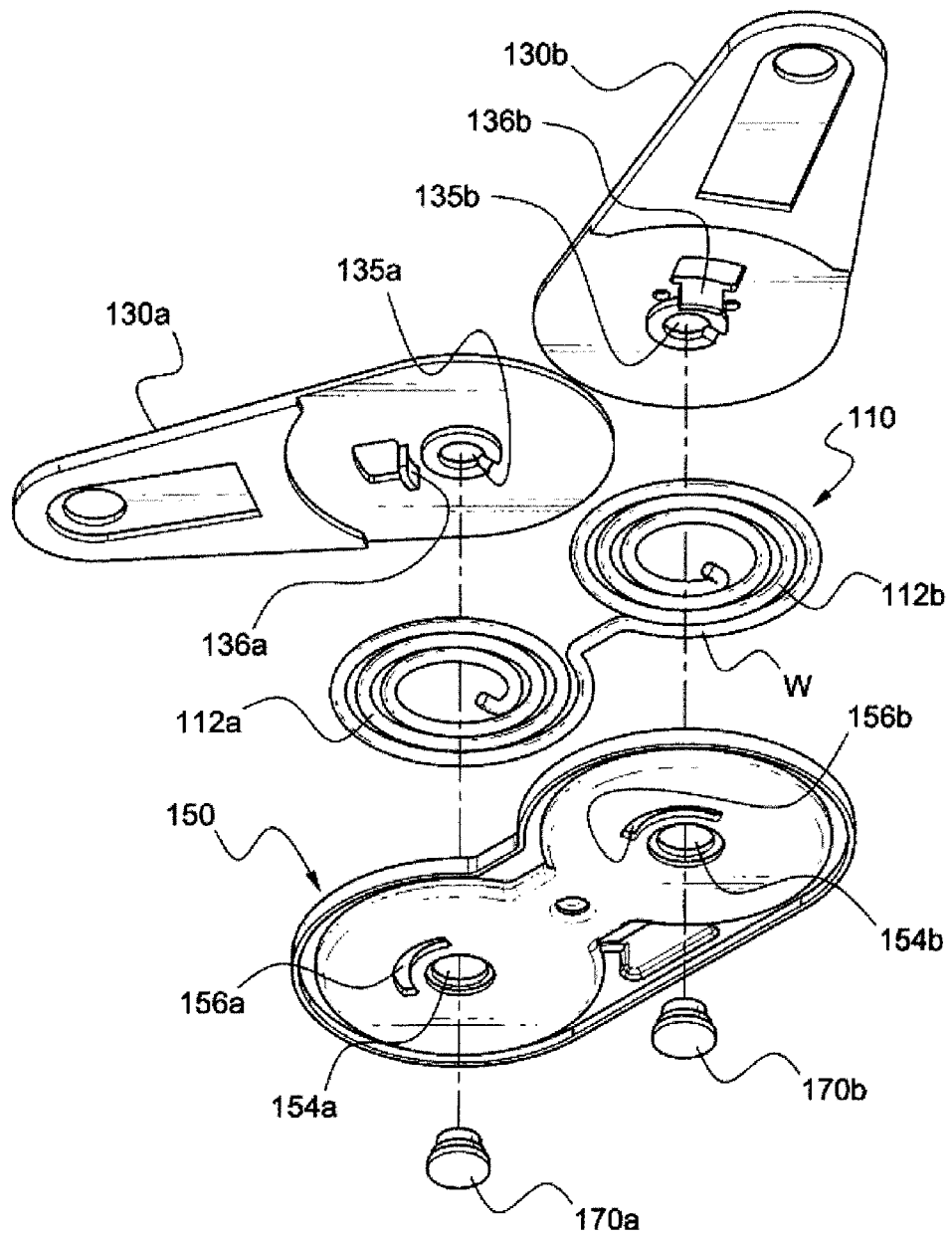
FIG. 9 is a rear perspective view of the elastic device shown in FIG. 8.

FIG. 7 is a plan view illustrating another embodiment of an elastic device according to the present invention, FIG. 8 is an exploded perspective view of the elastic device shown in FIG. 7, and FIG. 9 is a rear perspective view of the elastic device shown in FIG. 8.

As shown in FIGS. 7 to 9, the elastic device according to the present invention includes a torsion spring 110 having the first spiral part 112a and the second spiral part 112b, which are integrally formed as described in FIG. 6, and includes the first arm member 130a and the second arm member 130b, which are connected with each inner end of the first spiral part 112a and the second spiral part 112b, respectively. The elastic device also includes a connection member 150 receiving the torsion spring 110 to support it and connecting the first arm member 130a and the second arm member 130b with each other.

The distance of a connecting portion between the first spiral part 112a and the second spiral part 112b, and a curve angle thereof respective to each spiral part, etc., can be variously changed. In the torsion spring 110 shown in FIG. 7, a connecting portion thereof has a short distance and has a shape which is rapidly curved at a 90 degree angle respective to each direction of both spiral parts.

A torsion spring-seating recess 152 for receiving the torsion spring is formed in the connection member 150. The torsion spring-seating recess 152 includes the first spiral part-seating recess 152a for receiving the first spiral part 112a, and the second spiral part-seating recess 152b for receiving the second spiral part 112b. Connection member holes 154a and 154b, which are for rotatably supporting one end of the first arm member 130a and one end of the second arm member 130b, are formed at each central part of the first spiral part-seating recess 152a and the second spiral part-seating recess 152b, respectively. Also, arm member holes 135a and 135b are formed at each corresponding position of the first arm member 130a and the second arm member 130b, respectively. Hinge pins 170a and 170b are inserted, respectively, through the arm member holes 135a and 135b and the connection member holes 154a and 154b, and the first arm member 130a and the second arm member 130b is rotatably supported by each of the hinge pins 170a and 170b. The hinge pins 170a and 170b can be fixed in the connection member 150 and also can be rotated along the first arm member 130a and the second arm member 130b. A portion where the first arm member 130a and the second arm member 130b are connected with the connection member 150 is formed while having a step so as to have a thickness smaller than other part of the connection part 150.

As shown, the connecting member 150 includes the first stopper 156a and the second stopper 156b, which have a shape of a long hole for limiting each rotational range of the first arm member 130a and the second arm member 130b, and are formed along each circumference of the connection member holes 154a and 154b, respectively. The first and second latching parts 136a and 136b are formed at each corresponding position of the first arm member 130b and the second arm member 130b. The first and second latching parts 136a and 136b are inserted into the first stopper 156a and the second stopper 156b of a shape of a long hole, respectively, so that each rotational range thereof is limited. The first and second stoppers 156a and 156b and the first and second latching parts 136a and 136b are changed with each position thereof, respectively, and they can also be changed into another shape.

Figure 10:
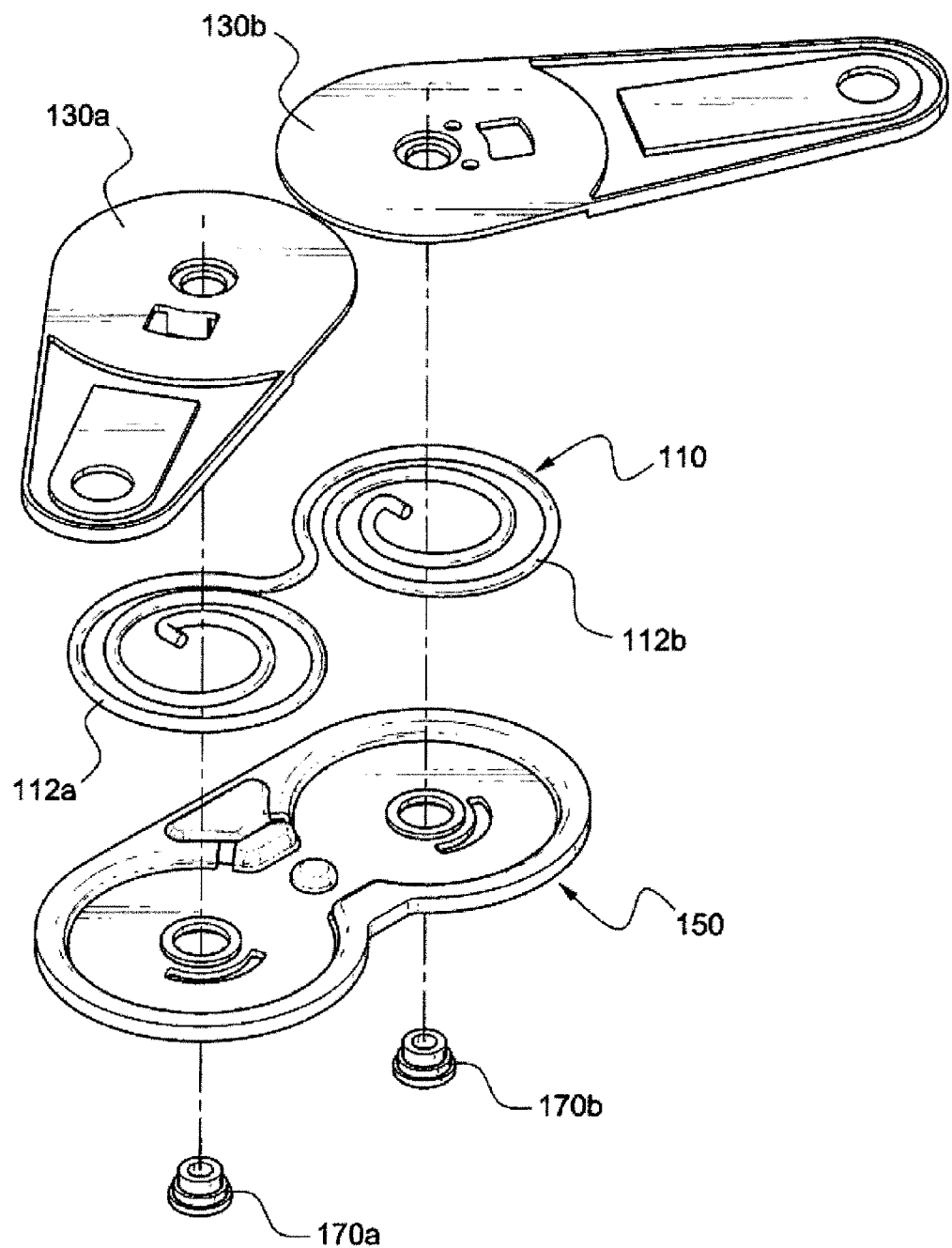
FIG. 10 is an exploded perspective view illustrating a modified embodiment of the elastic device shown in FIG. 8.

FIG. 10 is an exploded perspective view illustrating a modified embodiment of the elastic device shown in FIG. 8.

As the case may be, the first spiral part 112a and the second spiral part 112b are wound less than the winding times in the above-mentioned embodiment, so that the rest of the elastic device is equal to the above-mentioned embodiment.

Figure 11:
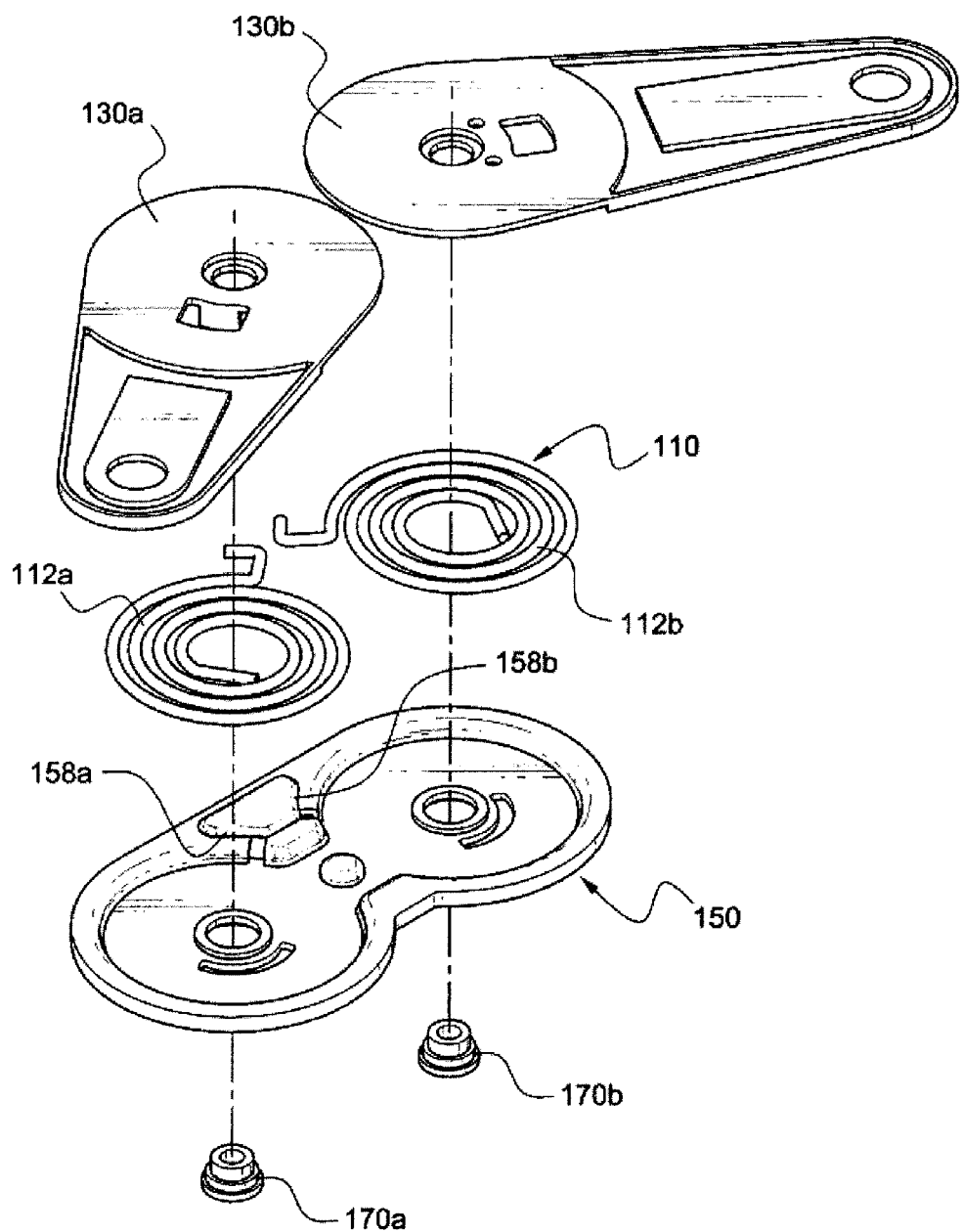
FIG. 11 is an exploded perspective view illustrating a modified embodiment of the elastic device shown in FIG. 8.
Figure 12:
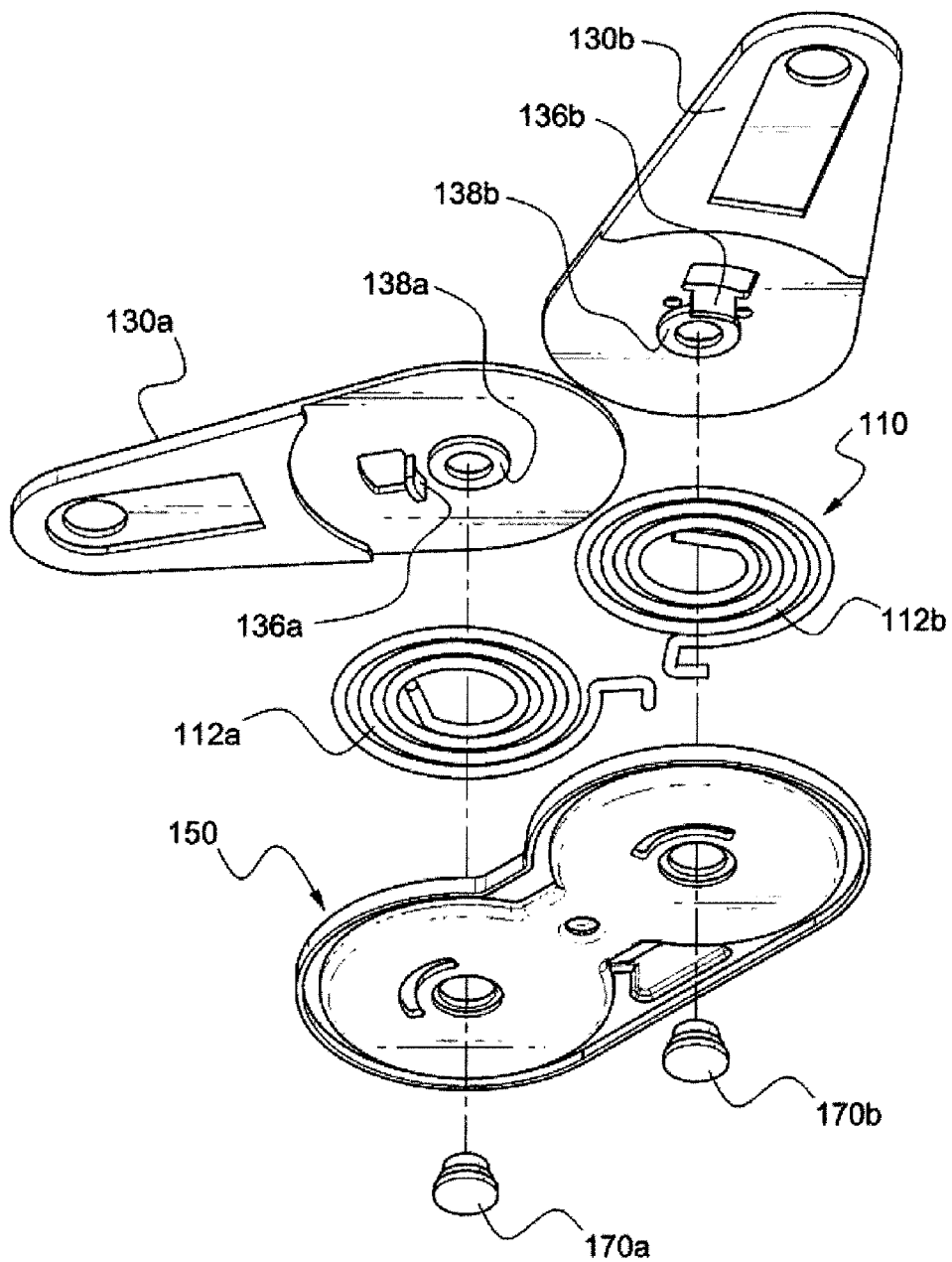
FIG. 12 is an exploded rear perspective view illustrating the modified embodiment of the elastic device shown in FIG. 11.

FIG. 11 is an exploded perspective view illustrating a modified embodiment of the elastic device shown in FIG. 8, and FIG. 12 is an exploded rear perspective view illustrating the modified embodiment of the elastic device shown in FIG. 11.

As shown, the torsion spring 110 can have the first spiral part 112a and the second spiral part 112b which are formed separately with each other. In this case, each outer end of the first spiral part 112a and the second spiral part 112b is fixed in the connection member 150, respectively. In order to accomplish this, each outer end of the first spiral part 112a and the second spiral part 112b is curved while making a "U" shape, and "U" shape grooves 158a and 158b are formed at the central part of one side of the connection part 150. Each inner end of the first spiral part 112a and the second spiral part 112b may be interposed between each latching part 136a and 136b, which protrude from each lower surface of the first arm member 130a and the second arm member 130b, respectively, in each lower direction, and each of the protrusions 138a and 138b so as to be fixed in the first arm member 130a and the second arm member 130b, respectively. The rest of the elastic device is the same as what has been described in FIGS. 8 to 10.

Figure 13:
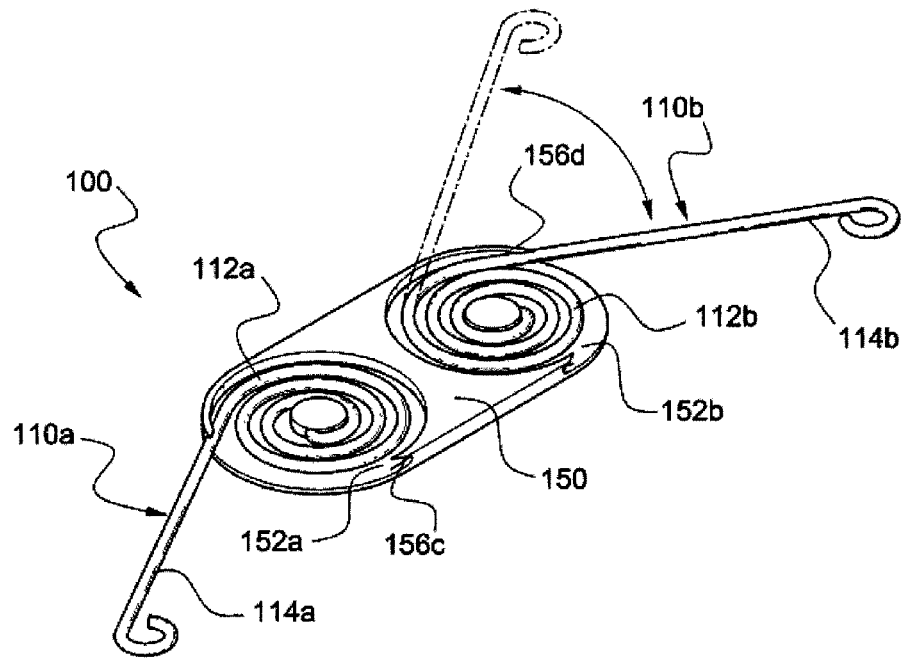
FIG. 13 is a perspective view illustrating another embodiment of an elastic device according to the present invention.
Figure 14:
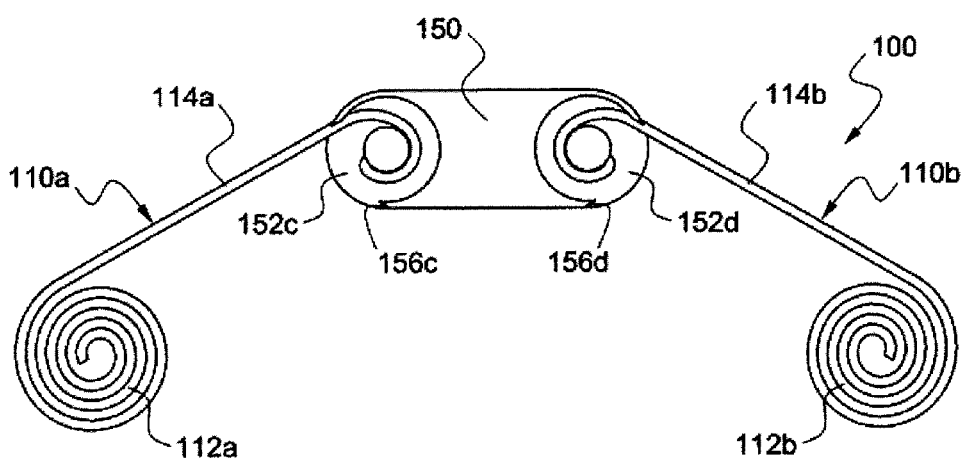
FIGS. 14 to 16 are perspective views illustrating a modified embodiment of the elastic device shown in FIG. 13.
Figure 15:
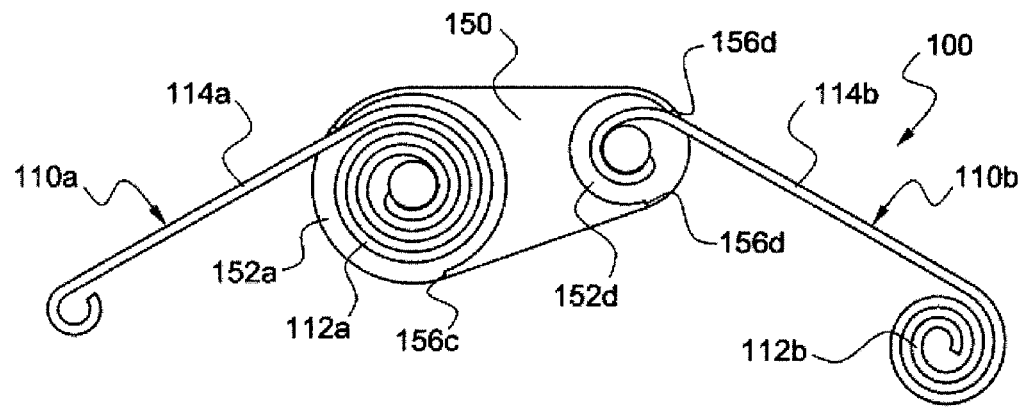
Figure 16:
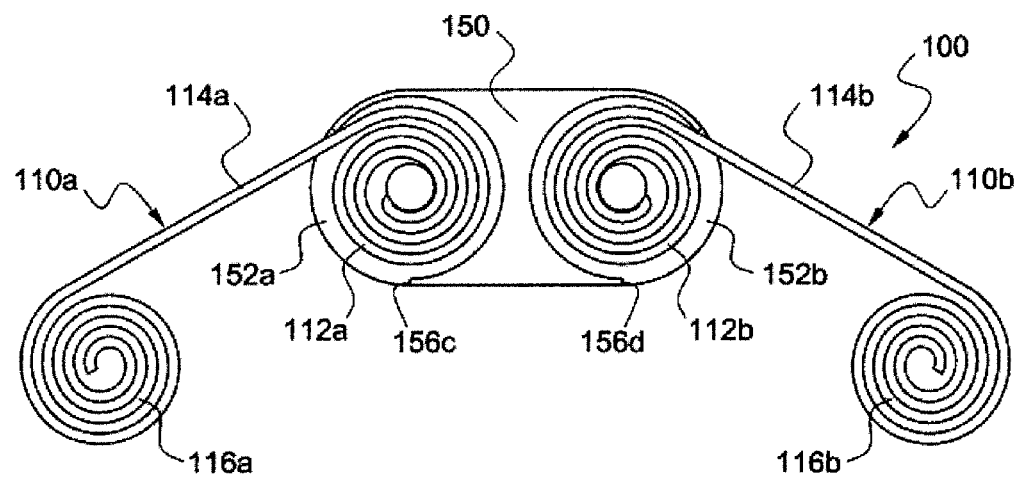

FIG. 13 is a perspective view illustrating another embodiment of an elastic device according to the present invention, and FIGS. 14 to 16 are perspective views illustrating a modified embodiment of the elastic device shown in FIG. 13.

The elastic device of the embodiments illustrating in FIGS. 13 to 16 includes the first torsion spring 110a and the second torsion spring 110b, which are formed separate from each other.

The first torsion spring 110a has the first spiral part 112a wound while making a spiral shape without a vertical overlapping portion thereof, and has a first extension arm 114a extending outward from one end of the first spiral part 112a.

The second torsion spring 110b is arranged while facing the first torsion spring 110a, and has a shape symmetrical to the first torsion spring 110a. Such second torsion spring 110b has the second spiral part 112b wound while making a spiral shape without a vertical overlapping portion thereof, and has the second extension arm 114b extending outward from the second spiral part 112b.

Although each end of the first extension arm 114a and the second extension arm 114b can have a circularly curved shape as shown, each end can also have a shape curved in an upper direction or lower direction so as to be inserted into a slot, etc., which is formed in a member in which the first extension arm 114a and the second extension arm 114b are installed, and is operated.

When the first torsion spring 110a and the second torsion spring 110b are assembled with the connection part 150, so as to enable the first torsion spring 110a and the second torsion spring 110b to be forced against the connection part 150, the first spiral part 112a and the second spiral part 112b can be formed in such a manner that each inner part thereof is gradually elevated or in such a manner that each inner end thereof is a little elevated.

As shown, the connection part 150 is assembled between the first torsion spring 110a and the second torsion spring 110b. As shown in FIG. 13, each inner end of the first spiral part 112a and the second spiral part 112b can be assembled with the connection part 150, respectively, while having an interval between them. Also, as shown in FIG. 14, each end of the first extension arm 114a and the second extension arm 114b can be assembled with the connection part 150, respectively, while having an interval between them. Also, as shown in FIG. 15, such two methods can be combined. Also, as the case may be, as shown in the embodiment of the first extension arm 114a or the second extension arm 114b of FIG. 13 or as shown in the embodiment of FIG. 16, it is possible for the elastic device to include the first extension arm 114a or the second extension arm 114b having outer ends thereof further having spiral parts 116a and 116b without a vertical overlapping portion thereof, respectively. In a case of an inner end of the first spiral part 112a or an inner end of the second spiral part 112b being assembled with the connection member 150, the first spiral part-seating recess 152a and/or the second spiral part-seating recess 152b for receiving the first spiral part 112a and/or the second spiral part 112b are/is preferably formed at each corresponding portion of the connection part 150. In the case of the outer end of first extension arm 114a or the outer end of the second extension arm 114b being assembled with the connection member 150, a connecting recess 152c or 152d is preferably formed at each corresponding portion of the connection part 150.

Connection member stoppers 156c and 156d are preferably formed in the connection member 150 so as to limit each rotational range of the first extension arm 114a and the second extension arm 114b. The connection member stoppers 156c and 156d are slanted at an acute angle or have each locking portion in which a part seated in the connection member 150 of each of the first extension arm 114a and the second extension arm 114b is locked so that it is preferable to prevent the first extension arm 114a and the second extension arm 114b to be separated. In an initial state of each external force of the first extension arms 114a of the first torsion spring 110a and second extension arms 114b of the second torsion spring 110b being removed, the first and second extension arms 114a and 114b can be unfolded equally to the second extension arm 114b illustrated by a dotted line as shown in FIG. 3. However, by considering elastic force, etc. caused by torsion moment, which is necessary for operation of a slid member, the first and second extension arms 114a and 114b are assembled in such a manner that the first and second extension arms 114a and 114b are sufficiently rotated so as to be locked in the connection member stoppers 156c and 156d, respectively. Therefore, By adjusting rotational angles is formed when portions seated in the connection member 150 of the first extension arm 114a and the second extension arm 114b are locked in the connection member stoppers 156c and 156d, respectively, the amount of elastic force caused by torsion moment of the elastic device 100 can be adjusted. This is one of the big advantages of the elastic device according to the present invention.

At this time, although a distance between both the outer ends of the first extension arm 114 and the second extension arm 114b is longer than the distance between a position where the first extension arm 114a is seated in the connection part 150 and a position where the second extension arm 114b is seated in the connection part 150 in most of the cases of the elastic device 100, depending on each case, the latter distance can be oppositely longer than the former distance so that an elastic device having such a structure can be used as a spring of a predetermined apparatus or as a component of an elastic body.

Figure 17:
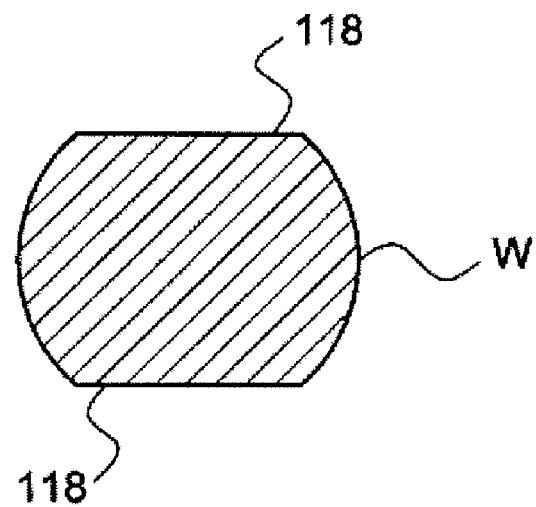
FIGS. 17 and 18 are sectional views illustrating an example of a sectional shape, except for a circular shape, of a spring wire used for constructing a torsion spring.
Figure 18:
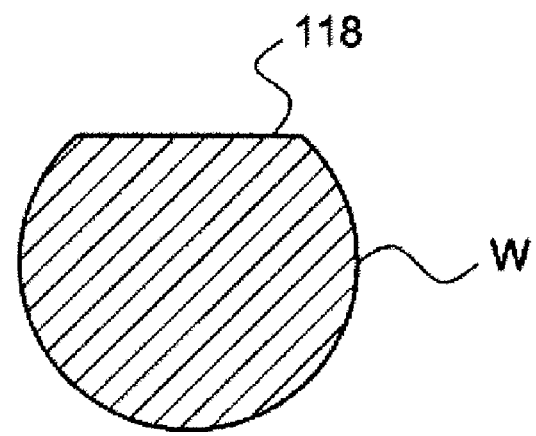

FIGS. 17 and 18 are sectional views illustrating an example of a sectional shape, except for a circular shape, of a spring wire used for constructing a torsion spring.

The torsion spring is formed of a spring wire (W), which is made of metal having a large amount of elastic force, and has a circular-shaped section thereof. However, in order to reduce the thickness of the torsion spring, a predetermined processing can be done before or after the torsion spring is produced. Specifically, a raw spring wire (w) having a circular sectional shape may be subjected to a vertical pressing, cutting, or drawing, so as to produce a finished spring wire having a sectional shape having a width larger than a thickness thereof. For example, as shown in FIGS. 17 and 18, the finished spring wire has at least one thickness reduction part 118, which is a flat surface formed at least one of the upper and lower surfaces of the spring wire. Furthermore, as the case may be, it would be easily understood that the torsion spring may be made of a spring wire having another polygonal-shaped section such as a square-shaped section.

Figure 19:
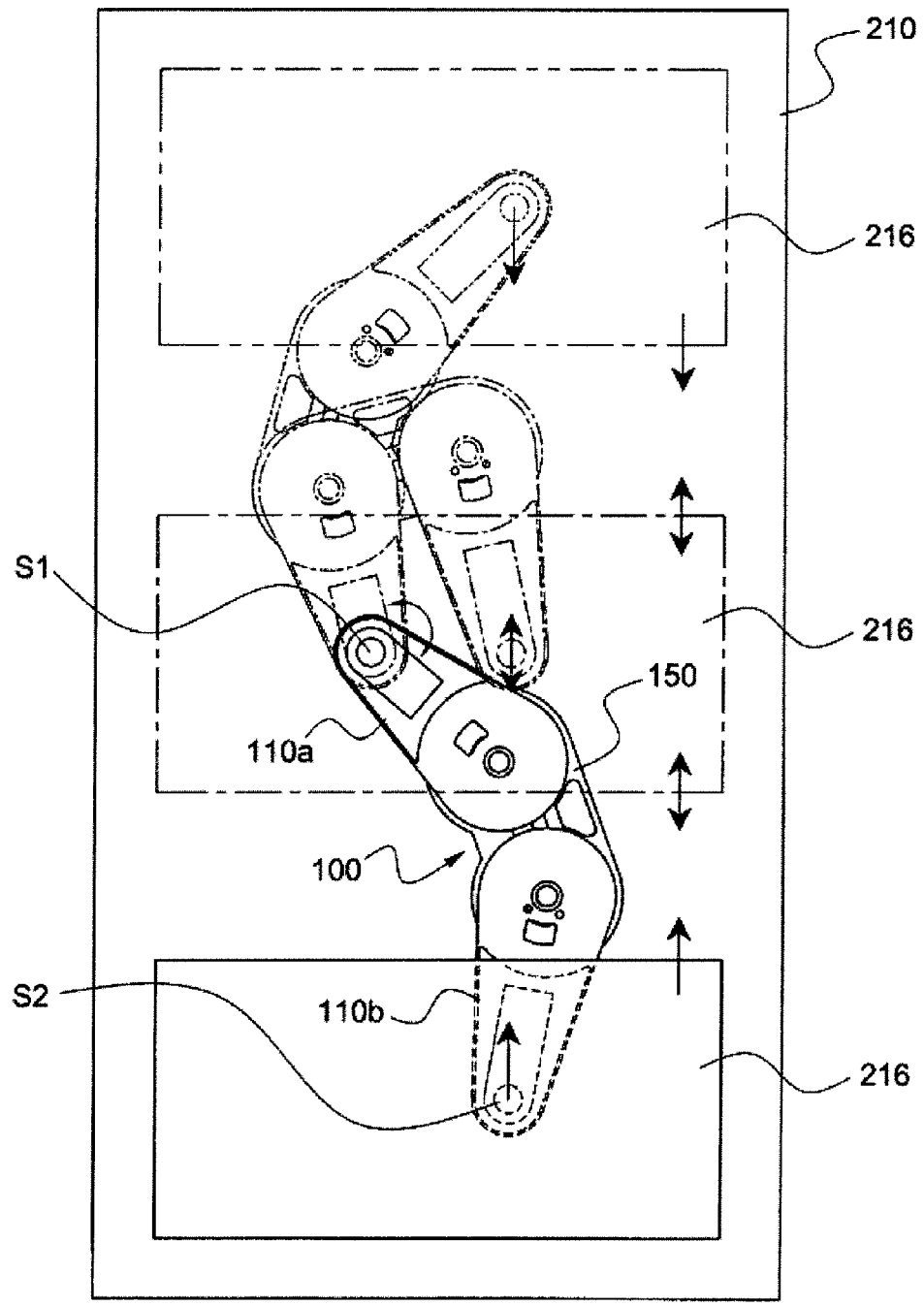
FIG. 19 is a view illustrating an example of the operation of an elastic device according to the present invention.

FIG. 19 is a view illustrating an example of operation of an elastic device according to the present invention.

In the elastic device 100 according to the present invention, one end of the first arm member 130a is assembled with a guide member 210 in such a manner that the one end of the first arm member 130a can be rotated, and one end of the second arm member 130b is assembled with a slide member 216 in such a manner that the one end of the second arm member 130b can be rotated. In this state, when the slid member 216 is forced toward an upper direction thereof by external force, the second arm member 130b moves in the upper direction so as to push the connection member 150 toward the upper direction, and the connection member 150 pushed the first arm member 130a in a counterclockwise direction. Of course, the connection member 150 allows the first arm member 130a and the second arm member 130b to be rotated. Accordingly, the first arm member 130a is rotated in a counterclockwise direction. A supporting end s2 of the second arm member 130b connected with the slide member 216 is elevated along with the slide member 216. As a result, the elastic device 100 is contracted up to a height of the supporting end s1 of the first arm member 130a. When the elastic device 100 is contracted, a torsion spring as far as the reduced-distance of elastic device 100, which is in an inner part forming a spiral shape thereof, is rotated to be pressed, and elastic force caused by torsion moment corresponding to the movement of the torsion spring is stored. After the supporting end s2 of the second arm member 130b passes the supporting end s1 of the first arm member 130a, even though external force is moved, the first arm member 130a and the second arm member 130b are unfolded from each other by elastic force caused by torsion moment of the elastic device 100 so as to push the slide member 216 in the upper direction thereof. As such, after the elastic device 100 is completely unfolded, if the user wants the slide member 216 to move in a lower direction thereof, counter operation of the above-described operation is performed.

FIGS. 20 to 23 are plan views illustrating embodiments of a sliding opening/closing apparatus with which an elastic device according to the present invention is equipped, respectively.

Figure 20:
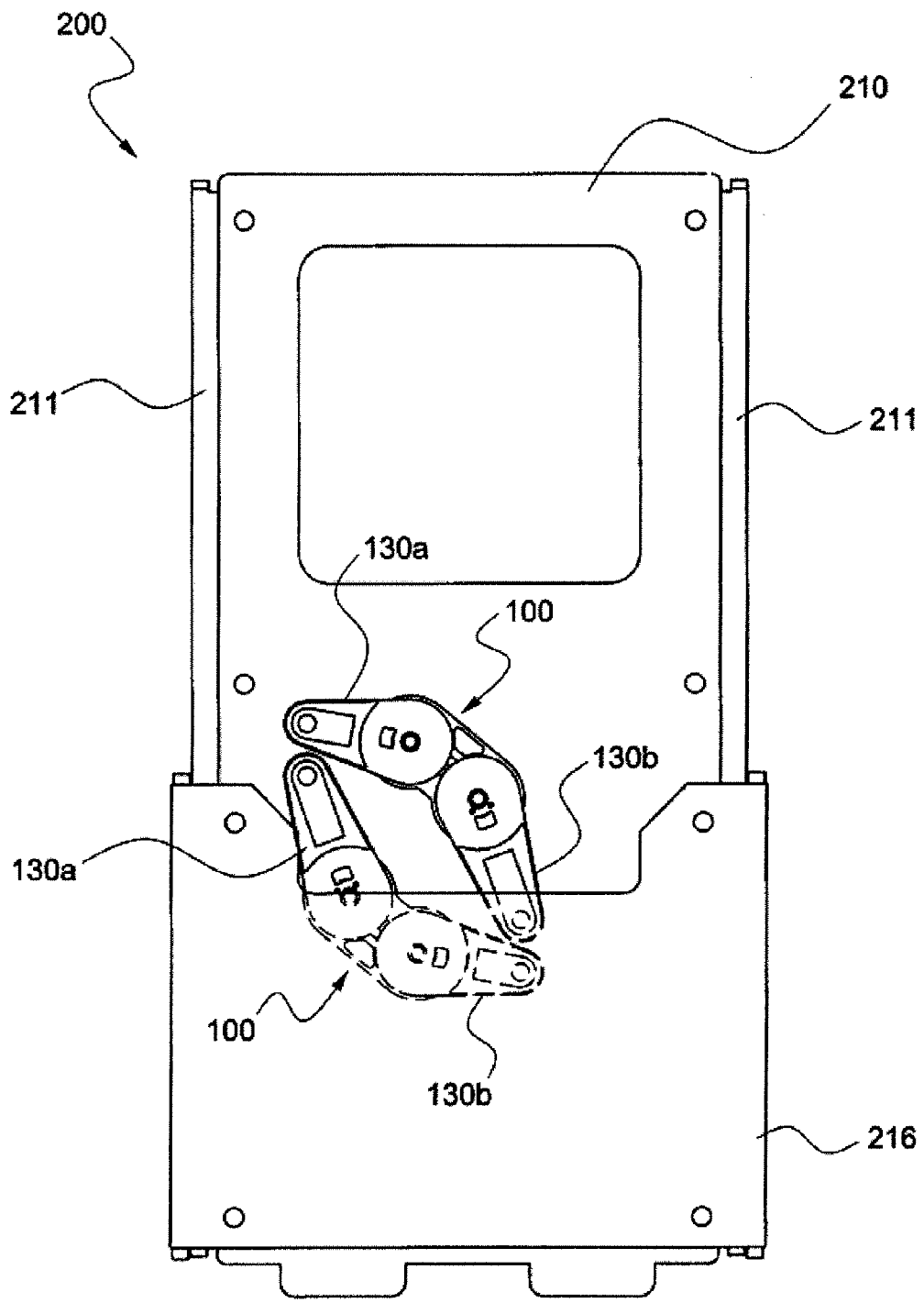
FIGS. 20 to 23 are plan views illustrating embodiments of a sliding opening/closing apparatus with which an elastic device according to the present invention is equipped, respectively.

As shown in FIG. 20, a pair of the elastic devices 100 according to the present invention are arranged between the guide member 210 and the slide member 216 while facing each other and having an interval between them. In FIG. 20 the first arm member 130a is assembled with a guide member 210 including a guide part 211 in such a manner that the first arm member 130a can be rotated, and the second arm member 130b is assembled with a slide member 216 which can move along the guide part 211 in such a manner that the second arm member 130b can be rotated at a standstill.

The elastic devices 100 are contracted or expanded while rotating according to a location where the side member 216 has been moved respective to the guide member 210. When external force is removed from the slid member 216, the elastic devices 100 are rotated and expanded so as to perform a function for pushing the slid member 216 in the first direction of the guide part 211 (an upper direction of the slid member 216) or the second direction of the guide part 211 (a lower direction of the slid member 216).

Since the elastic devices 100 according to the present invention can have a smaller thickness thereof as compared with a conventional elastic device, an interval between the guide member 210 and the slid member 216 is contracted more than that of the conventional elastic device, thereby securing a smaller thickness of a finished product such as an sliding opening/closing apparatus or a slide phone, etc. In comparison with the conventional elastic device, winding times of a spiral part can increase so that stress exerted to a torsion spring can be dispersed to the whole of the elastic device, and can prevent concentration of the stress.

Figure 21:
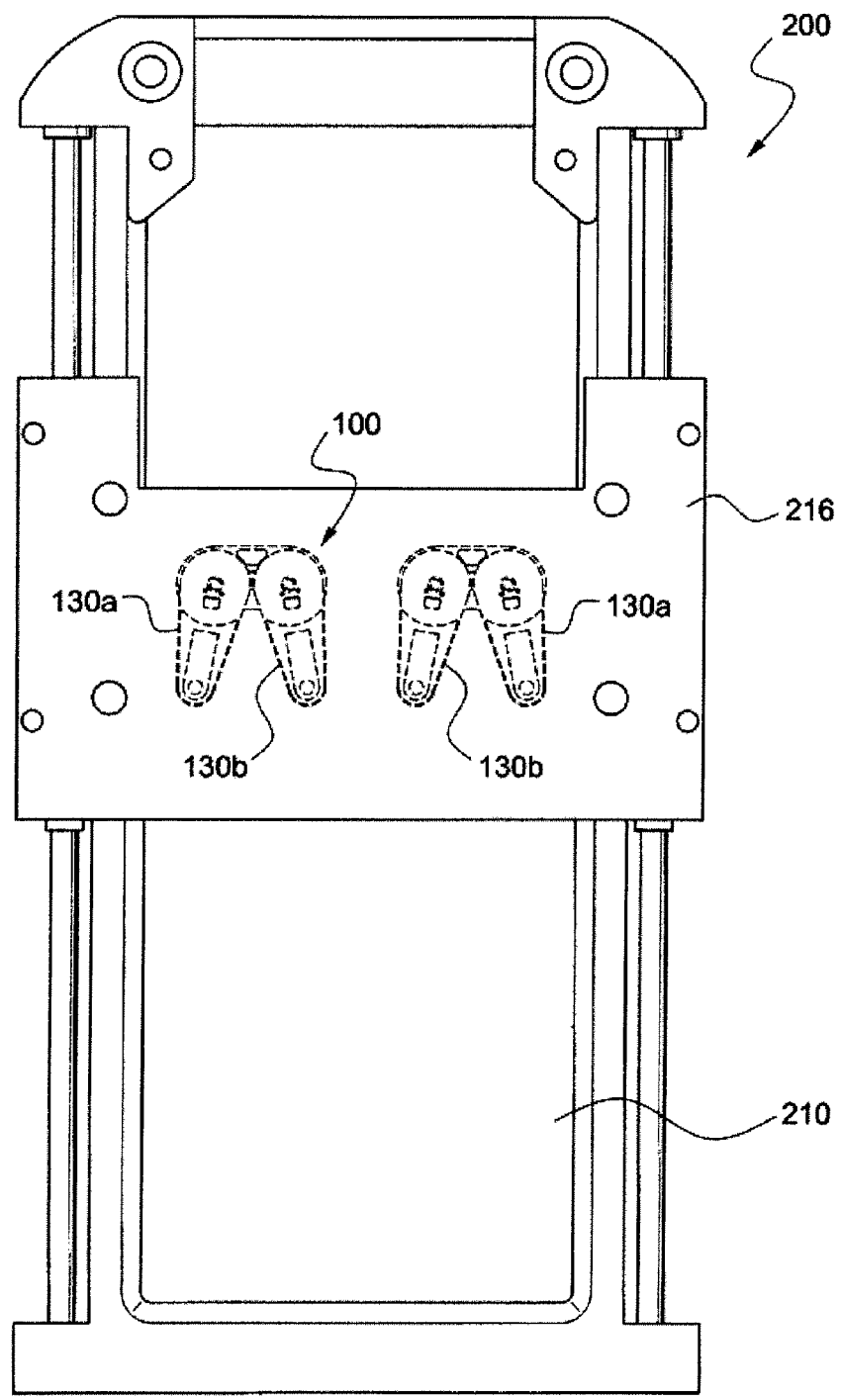

As the case may be, the sliding opening/closing apparatus 200 according to the present invention can have a structure including a pair of elastic devices 100 according to the present invention arranged in left and right sides parallel with each other between the guide member 210 and the slid member 216 as shown in FIG. 21. The rest things are of the elastic device is the same what has been described in FIG. 20.

Figure 22:
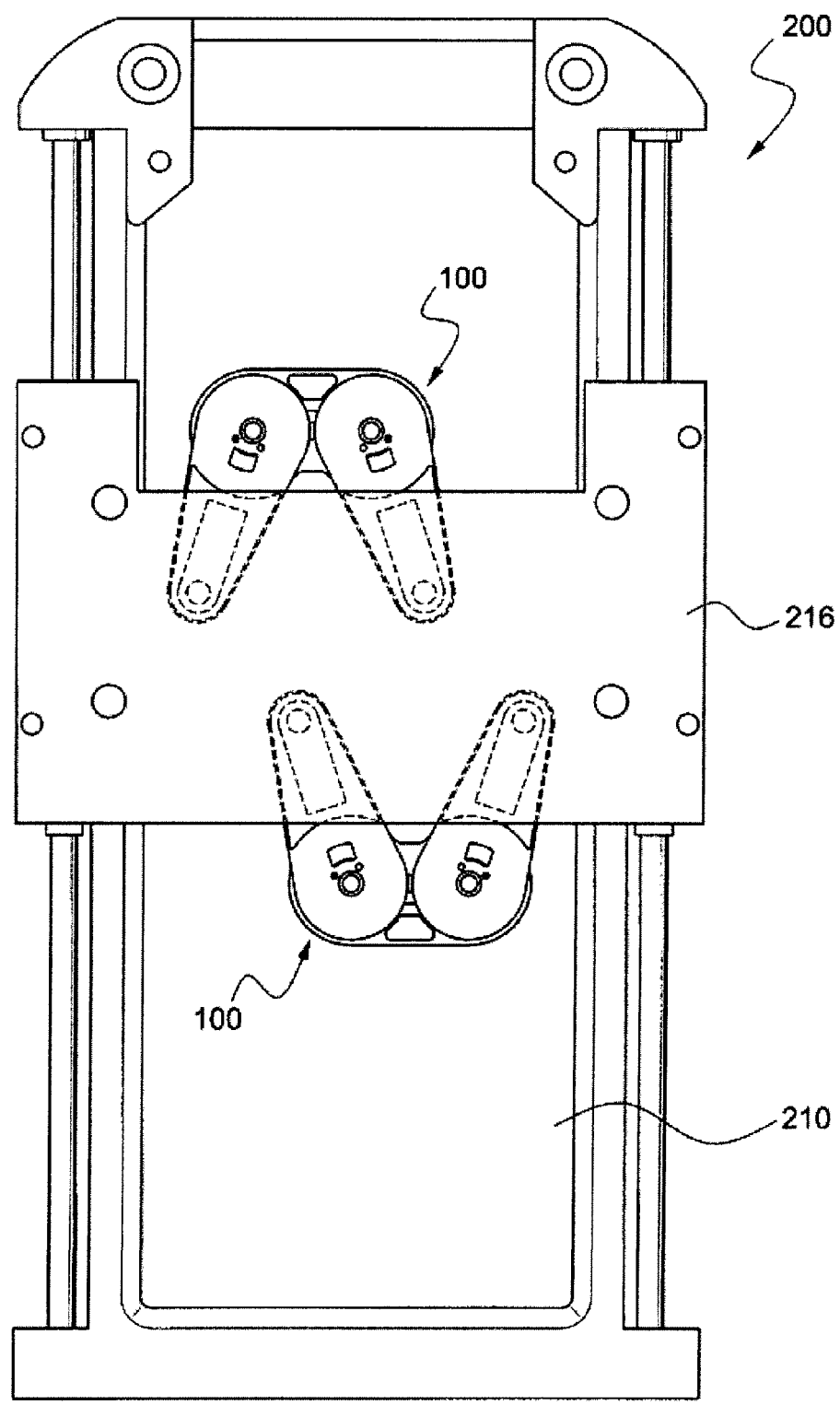

Furthermore, as the case may be, the sliding opening/closing apparatus 200 according to the present invention can have a structure including a pair of elastic devices 100, which are diagonally opposed to each other while being partially overlapped each other between the guide member 210 and the slid member 216, as shown in FIG. 22.

Figure 23:
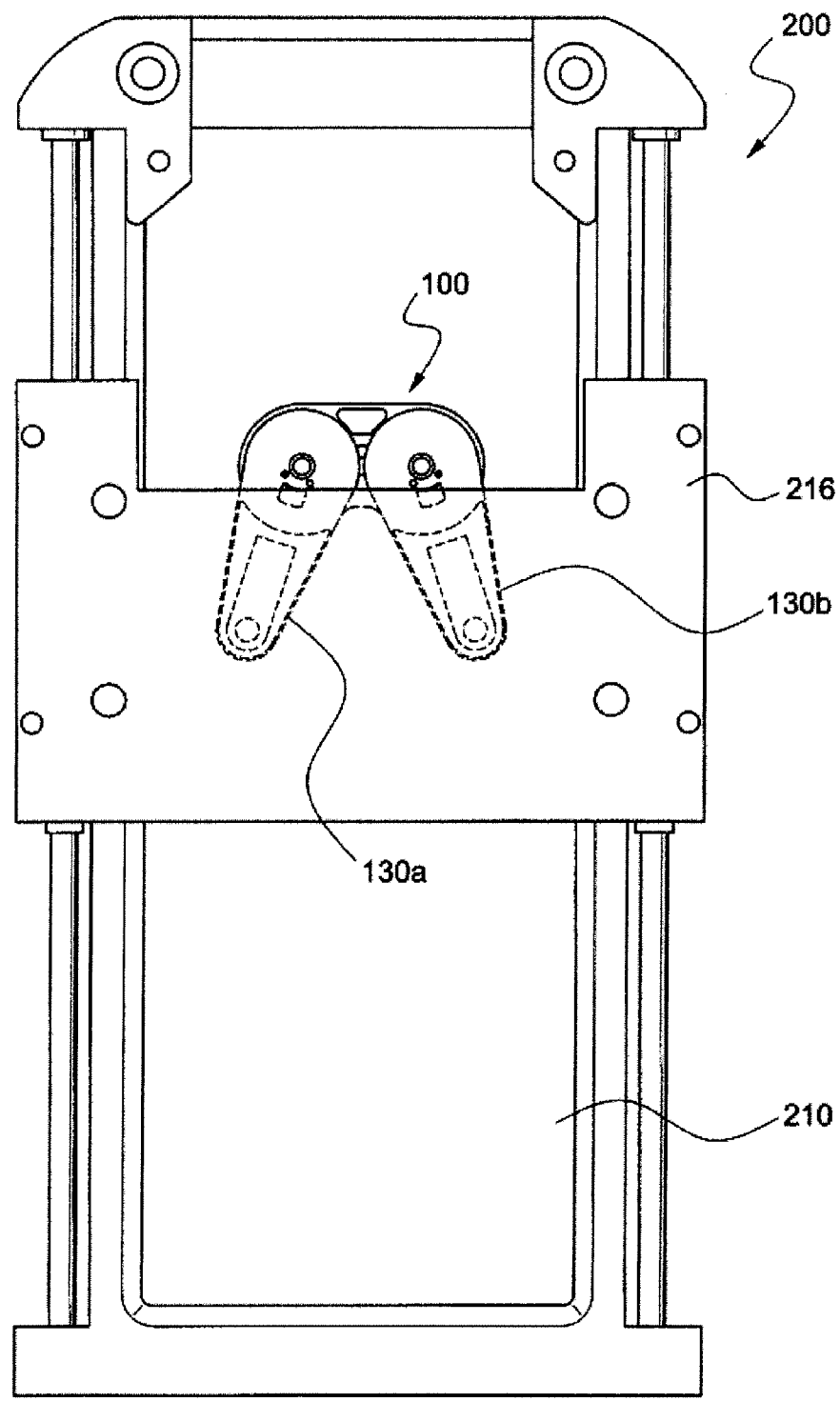

As shown in FIG. 23, the sliding opening/closing apparatus 200 according to the present invention can have a structure including one elastic device 100, which is a bigger size compared with that the above-mentioned embodiments, arranged between the guide member 210 and the slid member 216, as shown in FIG. 22.

Figure 24:
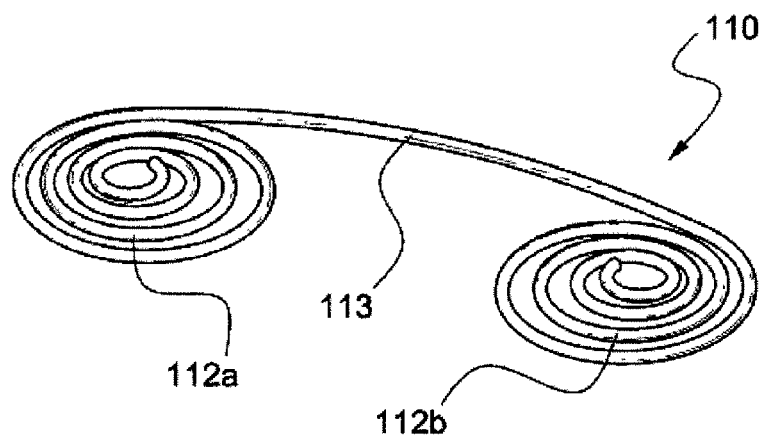
FIG. 24 is a view illustrating a modified embodiment of the torsion spring shown in FIG. 7.

FIG. 24 is a view illustrating a modified embodiment of the torsion spring shown in FIG. 7.

A connection portion 113 between the first spiral part 112a and the second spiral part 112b can have a relatively longer length and can have a shape formed in such a manner that each spring wire extending along a direction of a approximate tangent line respective to spiral direction of a corresponding spiral part is connected with each other. It can be easily understood that the length of the connection portion is shorter than that in FIG. 24.

Figure 25:
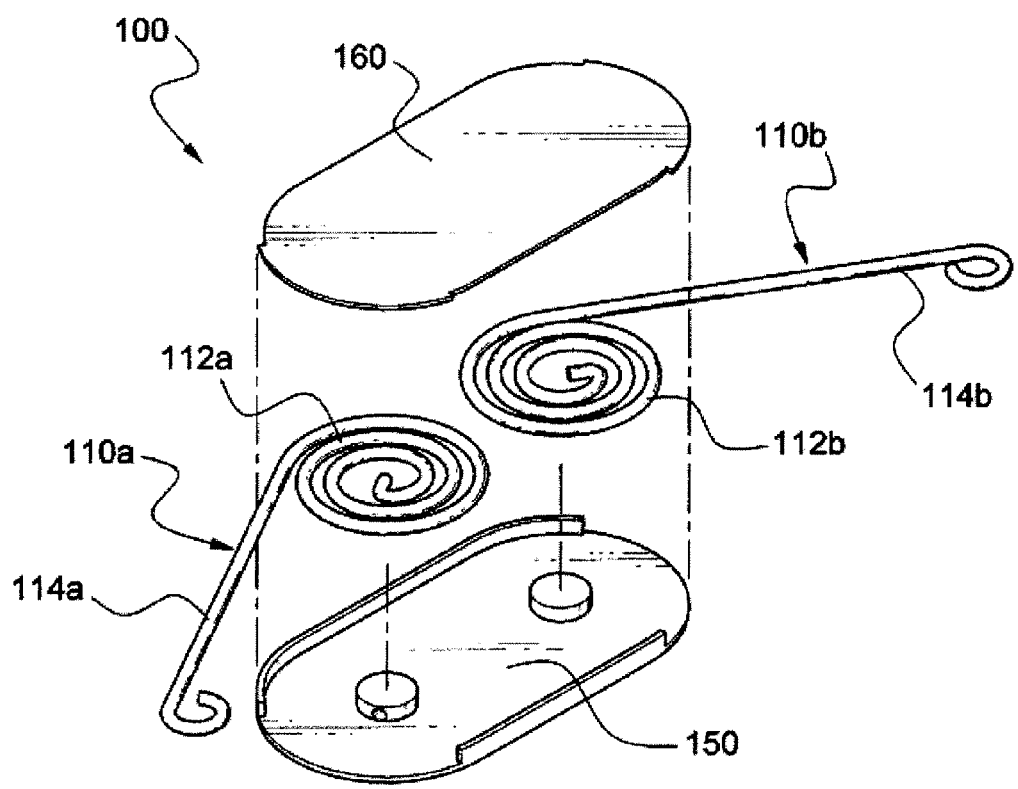
FIG. 25 is an exploded perspective view illustrating a modified embodiment of the elastic device shown in FIG. 13.
Figure 26:
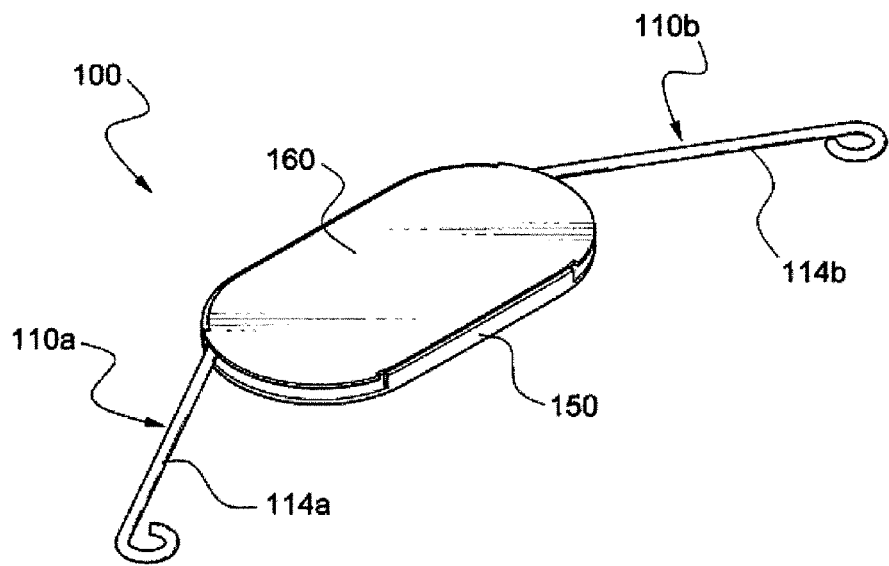
FIG. 26 is a perspective view illustrating a state of the assembled elastic device shown in FIG. 25.

FIG. 25 is an exploded perspective view illustrating a modified embodiment of the elastic device shown in FIG. 13, and FIG. 26 is a perspective view illustrating a state of the elastic device shown in FIG. 25, in which the elastic device is assembled.

As the case may be, a cover 160 is assembled with an upper surface of the connection member 150 in which the first torsion spring 110a and the second torsion spring 110b are installed, so that the connection member 150 can be covered. In this case, the first spiral part 112a and the second spiral part 112b can be covered by the cover 160, so that the first spiral part 112a and the second spiral part 112b are not exposed, and only the first extension arm 114a and the second extension arm 114b are exposed.

Figure 27:
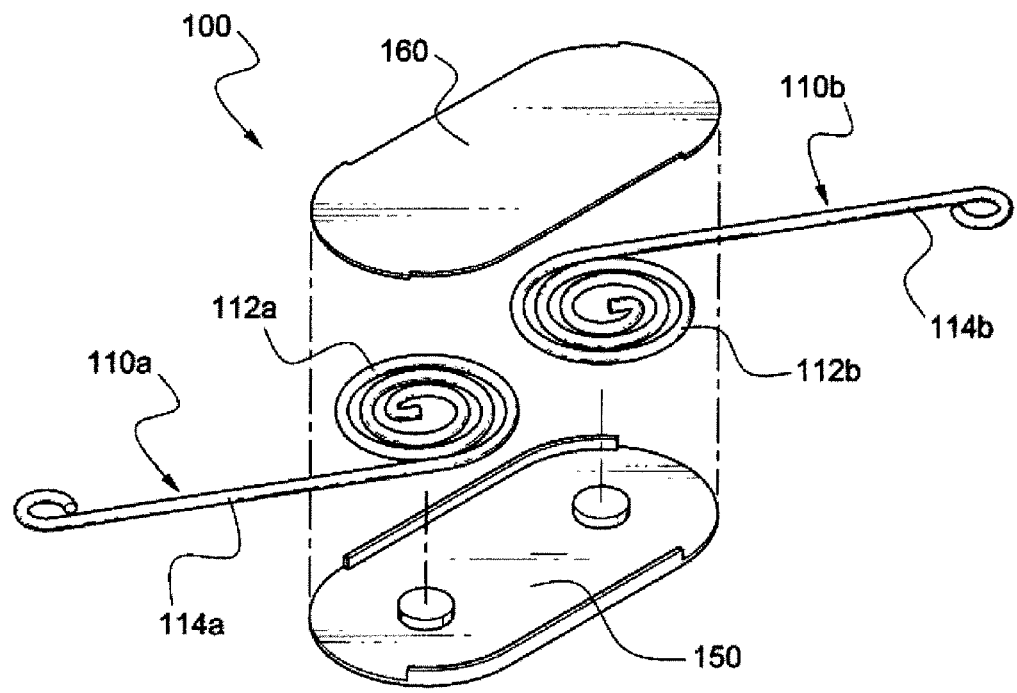
FIG. 27 is an exploded perspective view illustrating a modified embodiment of the elastic device shown in FIG. 25.
Figure 28:
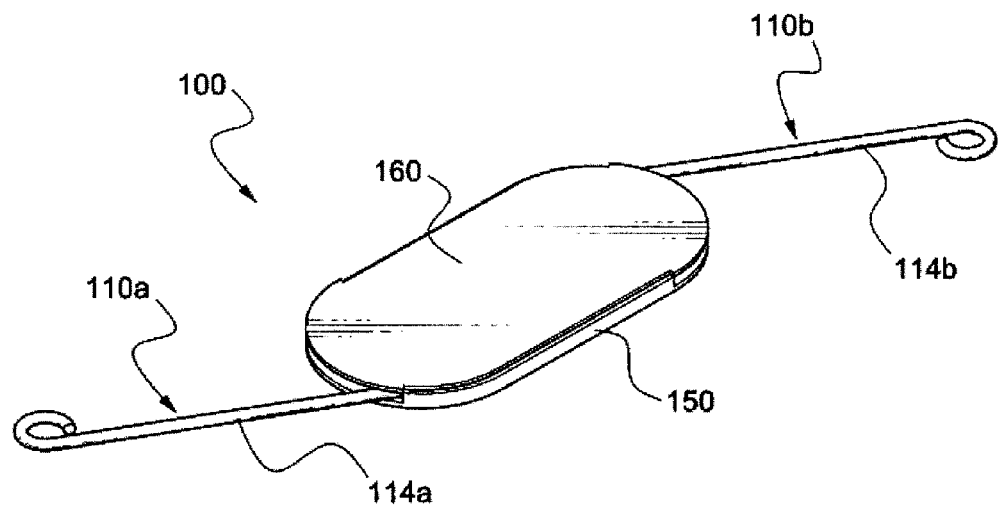
FIG. 28 is a perspective view illustrating a state of the assembled elastic device shown in FIG. 27.

FIG. 27 is an exploded perspective view illustrating a modified embodiment of the elastic device shown in FIG. 25, and FIG. 28 is a perspective view illustrating a state of assembled the elastic device shown in FIG. 27.

The elastic device 100 shown in FIGS. 27 and 28 includes the second torsion spring 110b of the embodiment shown in FIGS. 25 and 26 installed in a changed direction. The rest things are of the elastic device is the same what has been described in FIGS. 25 and 26.

Figure 29:
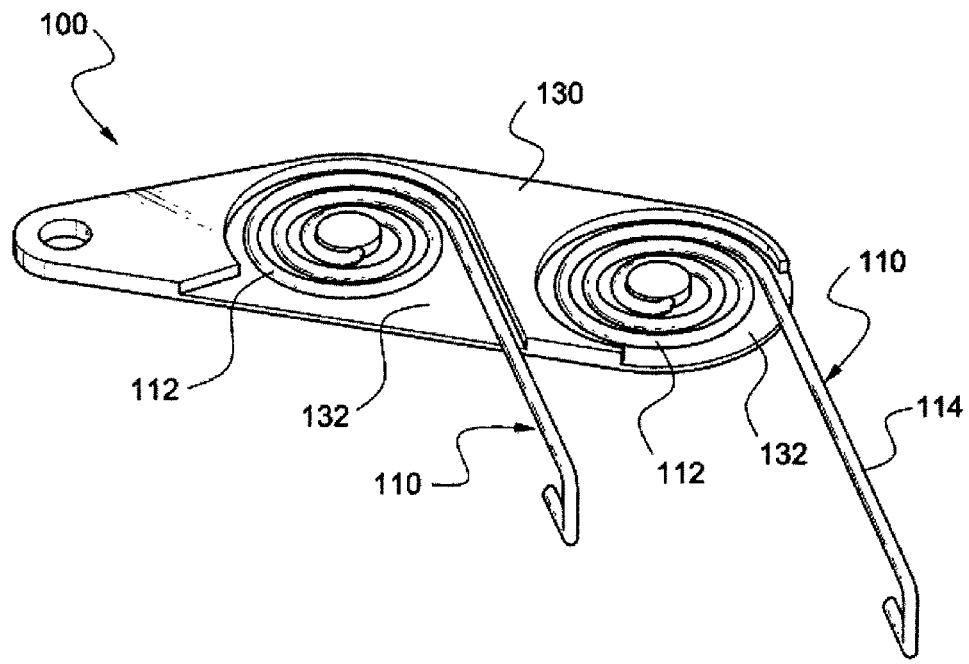
FIG. 29 is a perspective view illustrating another modified embodiment of the embodiment of the elastic device shown in FIG. 4.

FIG. 29 is a perspective view illustrating another modified embodiment of the embodiment of the elastic device shown in FIG. 4.

As the case may be, an elastic device 100 according to the present invention can have two torsion springs 110 installed in the arm member 130 side by side parallel to each other. In such a structure of the elastic device 100, an elastic device 100 providing elastic force caused by a relatively larger amount of torsion moment can be made, and winding times of each spiral part 112 of each torsion spring 110 can be adjusted. Therefore, the user can variously select the amount of elastic force caused by torsion moment. This is very advantageous in designing an apparatus.

Figure 30:
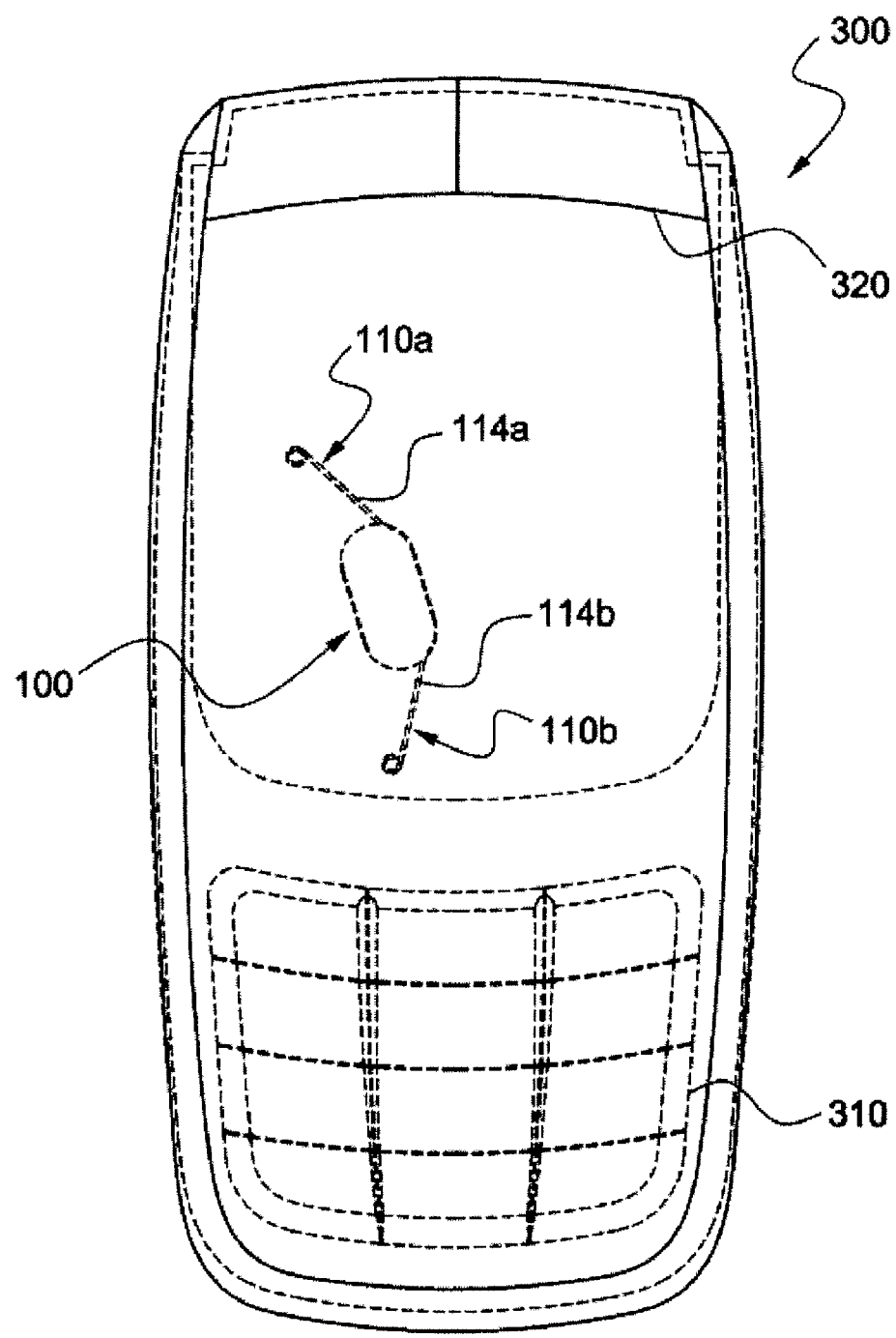
FIGS. 30 to 32 are views illustrating a sliding opening/closing apparatus, in which an elastic device according to the present invention is mounted between the main body of the apparatus and a cover thereof.
Figure 31:
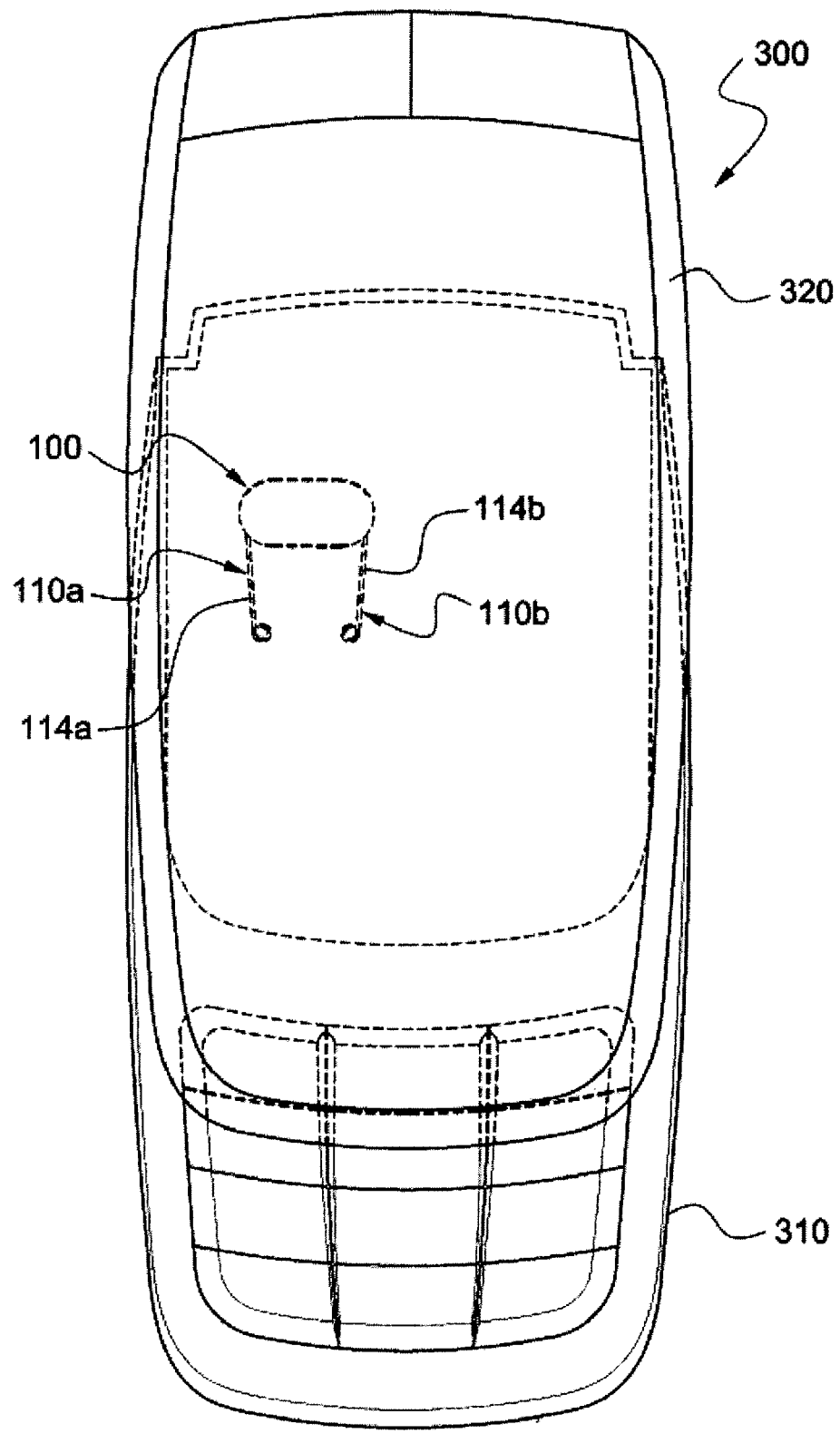
Figure 32:
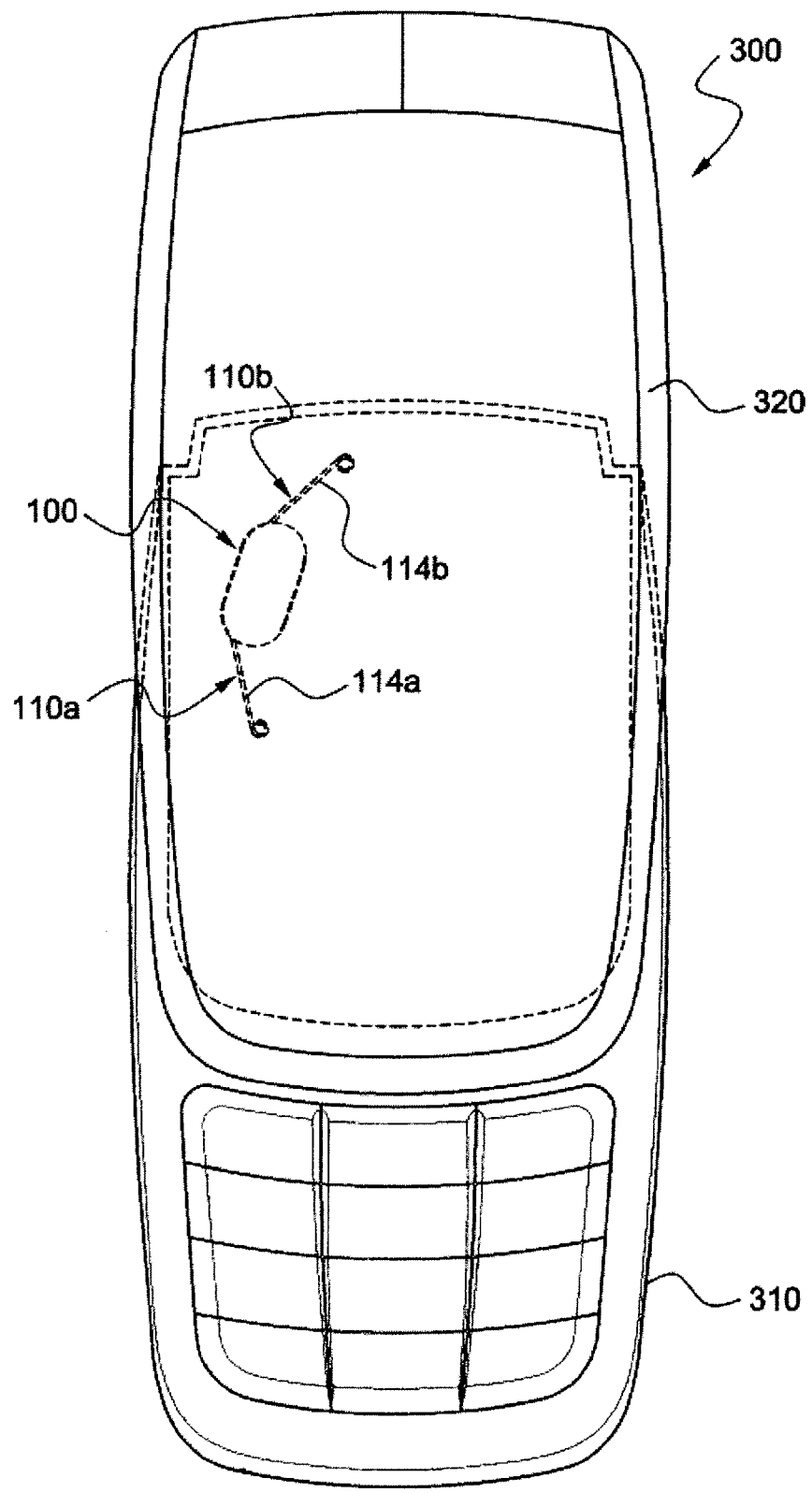

FIGS. 30 to 32 are views illustrating a sliding opening/closing apparatus, in which an elastic device according to the present invention is mounted between a main body of the apparatus and a cover thereof. FIG. 30 is a view illustrating the sliding opening/closing apparatus in which the cover is closed respective to the main body, and FIG. 31 is a view illustrating the sliding opening/closing apparatus in which the cover is opened respective to the main body by half.

FIGS. 30 to 32 illustrate a state of a sliding opening/closing apparatus 300 according to the present invention being actually employed in a slide phone. The sliding opening/closing apparatus 300 according to the present invention includes a main body 310 thereof, a cover 320, and an elastic device 100 installed between the main body 310 and the cover 320. The elastic device 100 described in FIG. 26 is employed as the elastic device 100.

The main body 310 includes a guide part (not shown) formed along a longitudinal direction thereof, and the cover 320 is assembled with the guide part so as to slide along upper and lower directions. As used herein, the main body 310 functions as a guide member of the sliding opening/closing apparatus 300 according to the present invention, and the cover 320 functions as a slide member.

The elastic device 100 according to the present invention has one end thereof rotatably assembled with the main body 310 and the other end rotatably assembled with the cover 320.

In a state shown in FIG. 30, the user pushes the cover 320 in an upper direction of the main body, the elastic device 100 is rotated in a counterclockwise direction while centering a supporting point of the first extension arm 114a of the first torsion spring 110a supported by the main body 310, and the second extension arm 114b of the second torsion spring 110b connected with the cover 320 is rotated while centering the supporting point so as to be raised in the upper direction. A supporting point of the second extension arm 114b linearly moves. In a state shown in FIG. 30, the elastic device 100 is contracted until the elastic device 100 becomes a state shown in FIG. 31, so that the supporting positions of the first and second extension arms 114a and 114b are closed each other. In a state beyond the state shown in FIG. 31, when external force is removed, the elastic device 100 pushes the cover 320 in an upper direction of the main body while the first and second extension arm 114a and 114b are unfolded from each other, so that the cover 320 can be opened as shown in FIG. 32. Meanwhile, the cover 320 can be closed by a counter operation of the operation of opening the cover 320.

Figure 33:
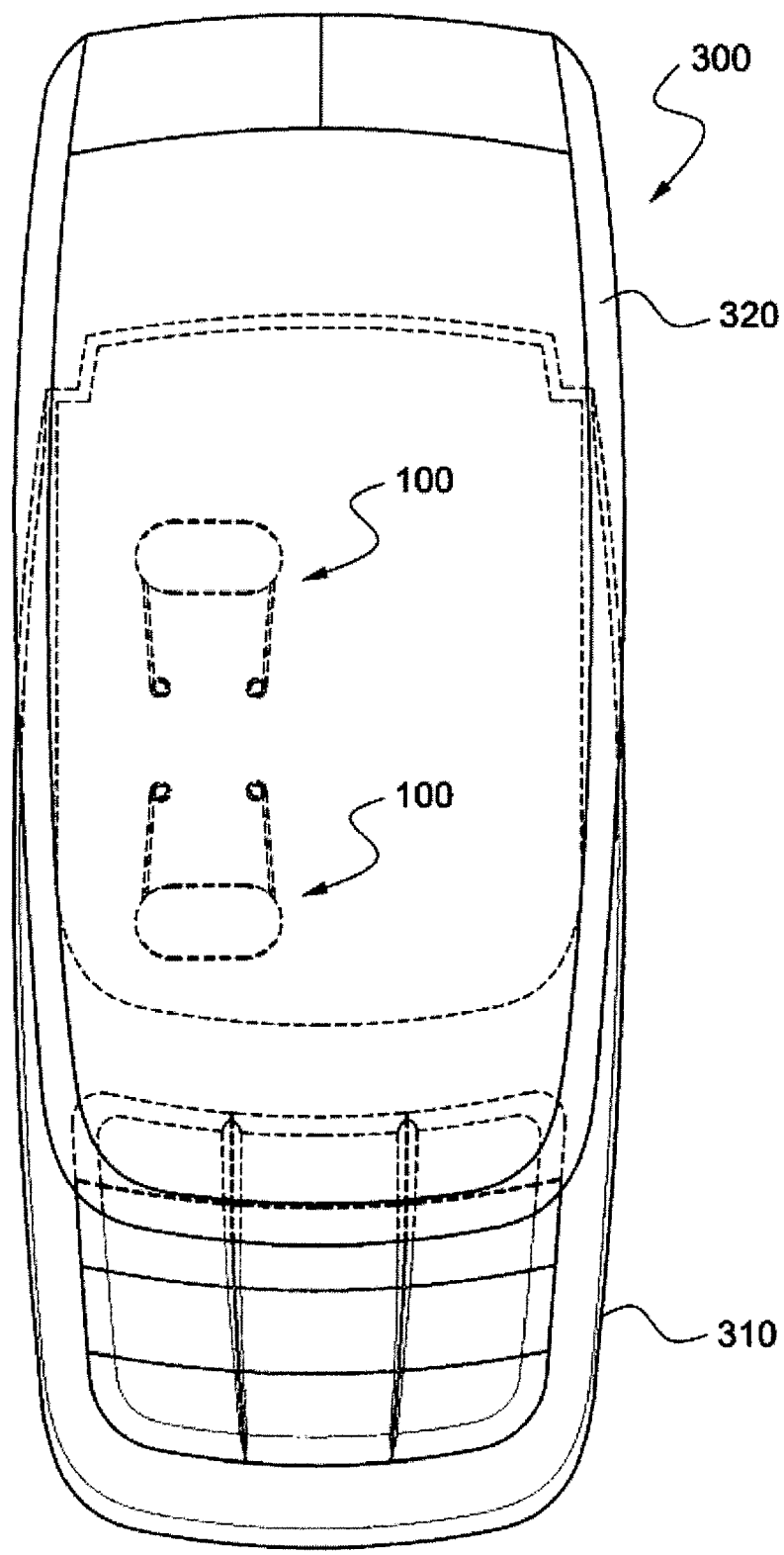
FIG. 33 is a view illustrating another embodiment of a sliding opening/closing apparatus, in which an elastic device is mounted.

FIG. 33 is a view illustrating another embodiment of a sliding opening/closing apparatus, in which an elastic device is mounted.

As shown in FIG. 33, the sliding opening/closing apparatus 300 according to the present invention can have a structure including a pair of elastic devices 100 arranged in directions opposite to each other, respectively, while facing each other between the main body 310 and the cover 320.

Additional types of an elastic device 100 and a scheme for arranging an elastic device 100 can be variously changed depending on necessity as described through FIGS. 20 to 23. The above-described elastic devices can also be constituted in a sliding opening/closing apparatus according to the present invention, which can have a structure including a single elastic device or more than a pair of elastic devices arranged at a proper position between a guide member and a slid member parallel to each other in left and right directions or diagonal to each other in upper and lower directions, depending on the condition of a desired product to be made.

Figure 34:
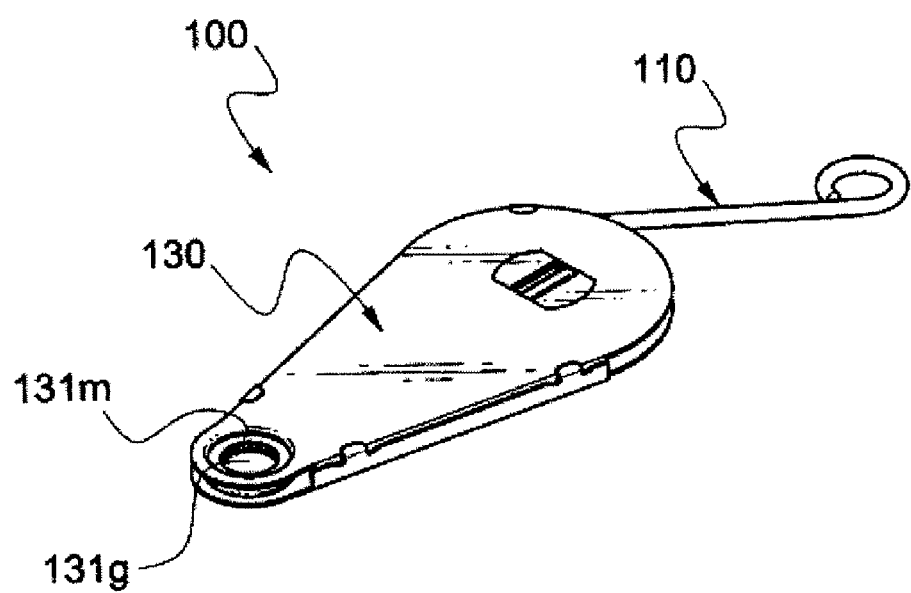
FIG. 34 is a perspective view illustrating another embodiment of an elastic device according to the present invention.
Figure 35:
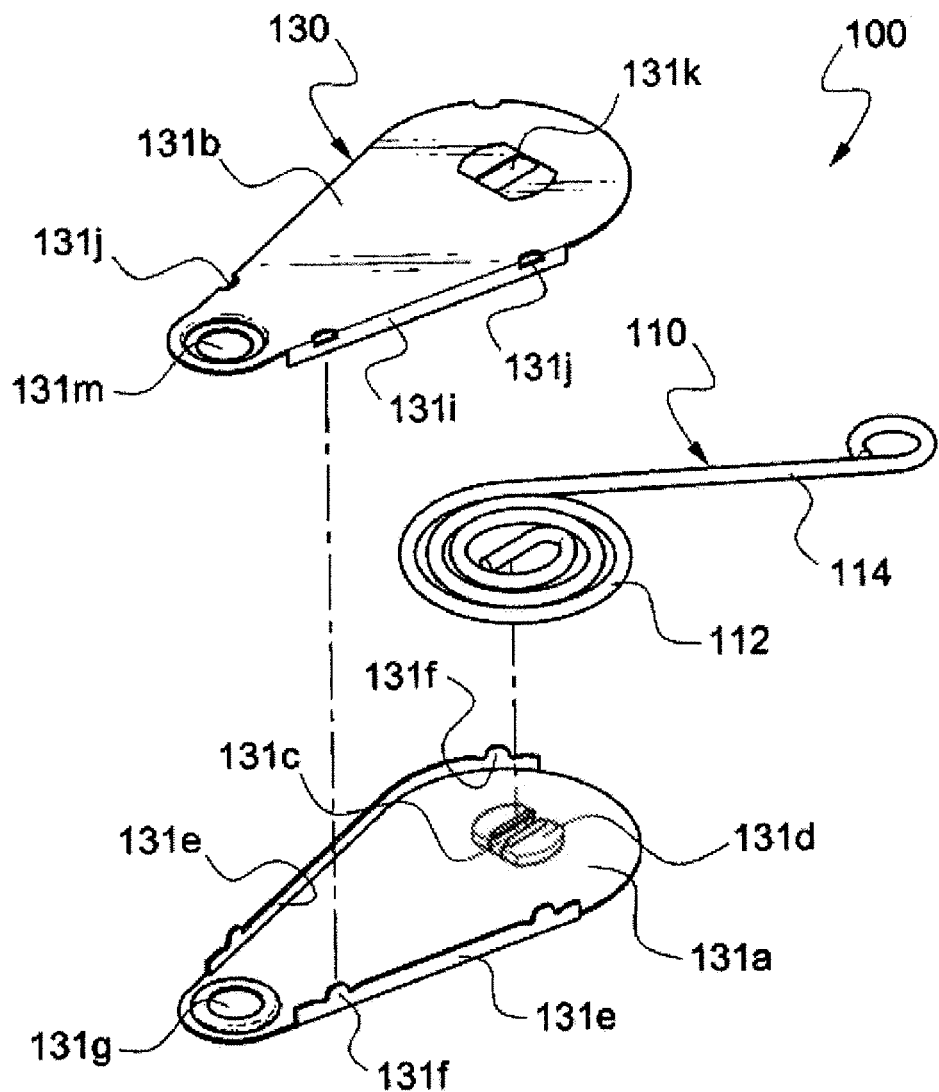
FIG. 35 is an exploded perspective view of the elastic device shown in FIG. 34.

FIG. 34 is a perspective view illustrating another embodiment of an elastic device according to the present invention, and FIG. 35 is an exploded perspective view of the elastic device shown in FIG. 34.

A torsion spring as shown in FIGS. 34 and 35 includes a spiral part 112 and an extension arm 114 as described above.

An arm member 130 has the first sheet member 131a and the second sheet member 131b assembled with each other in such a manner as to facing each other and have an interval between them in which one end of the torsion spring 110 is disposed so as to allow the torsion spring to move.

As shown, protrusions 131d for coupling the torsion spring are formed at one end of the first sheet member 131a. The protrusions 131d are formed at both sides of a gap 131c into which an inner end of the torsion spring 110 can be inserted, which is pressed toward an interior to extend from an inner surface of the first sheet member 131a. The inner end of the torsion spring is engaged with this gap 131c so as to be coupled with the arm member 130.

The first rim 131e is formed in the first sheet member 131a at both sides along a longitudinal direction thereof while curved toward the second sheet member 131b, except for a portion of the first sheet member 131a for allowing the torsion spring 110 to be rotated to be moved and the other end of the first sheet member 131a to be connected with other component. Coupling protuberances 131f are formed at an interval on the first rim 131e. A connection hole 131g for allowing the arm member 30 to be connected with other components is formed on the arm member. The circumferential portion of this connection hole 131g is pressed to protrude toward an interior of the arm member 30.

The second rim 131b is formed in the second sheet member 131b in both sides along a longitudinal direction thereof while curved toward the first sheet member 131a, except for a portion of the second sheet member 131b for allowing the torsion spring 110 to be rotated and allowing the other end of the second sheet member 131b to be connected with other components. Coupling grooves 131j are formed at an interval in a lower part of the second rim 131j, which allow the coupling protuberances 131f to be curved and engaged therewith so as not to allow the first sheet member 131a and the second sheet member 131b to be separated from each other.

A gap hole 131k is formed in the second sheet member 131b while having a width larger than the gap 131c and larger enough to support both sides of an upper part of a torsion spring coupling protrusion 131d. It is preferable that the periphery portion of the gap hole 131k is pressed to protrude at a low degree toward an interior of the second sheet member 131b. In such a case, the gap 131c of the torsion spring coupling protrusion 131d is not large so that the torsion spring 110 can be supported. The upper part of a torsion spring coupling protrusion 131d can be inserted into the gap hole 131k so that the torsion spring coupling protrusion 131d can have a sufficient high elevation. A connection hole 131m for allowing the arm member 130 to be connected with other component is formed on the arm member 130 opposite to the gap hole 131k.

Figure 36:
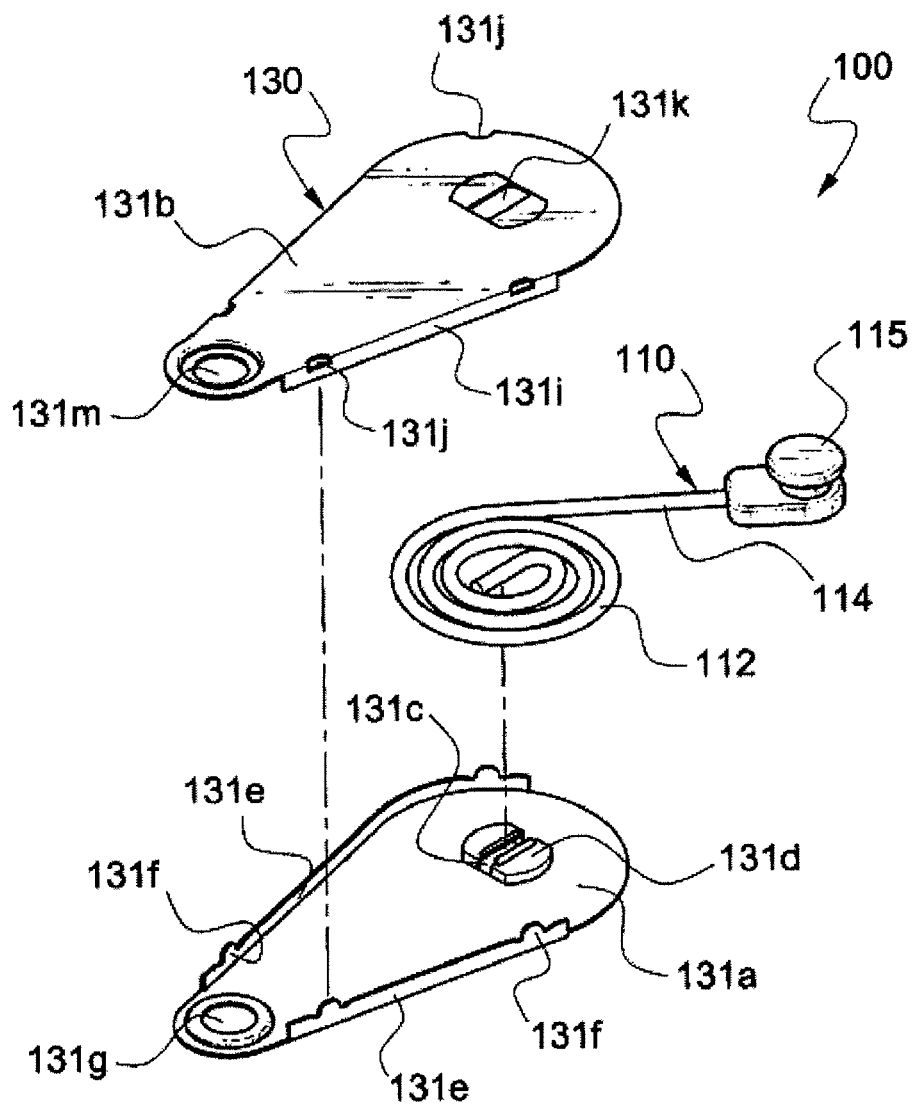
FIG. 36 is an exploded perspective view illustrating a modified embodiment of the embodiment of the elastic device shown in FIG. 35.

FIG. 36 is an exploded perspective view illustrating a modified embodiment of the embodiment of the elastic device shown in FIG. 35.

As the case may be, a spring wire of the torsion spring 110 can have a square-shaped section which is not a circular-shaped section. The torsion spring 110 can be made in such a manner that the hinge member 115 is molded to be inserted into an end of the extension arm 114 of the torsion spring 110. The rest things are of the elastic device is the same what has been described in FIGS. 34 and 35.

As used herein, the torsion spring coupling protrusions 131d, the coupling protuberances 131f, and coupling grooves 131j can be formed at the first sheet member 131a and the second sheet member 131b in such a manner that their original positions are changed with each other between the first sheet member 131a and the second sheet member 131b therein.

Figure 37:
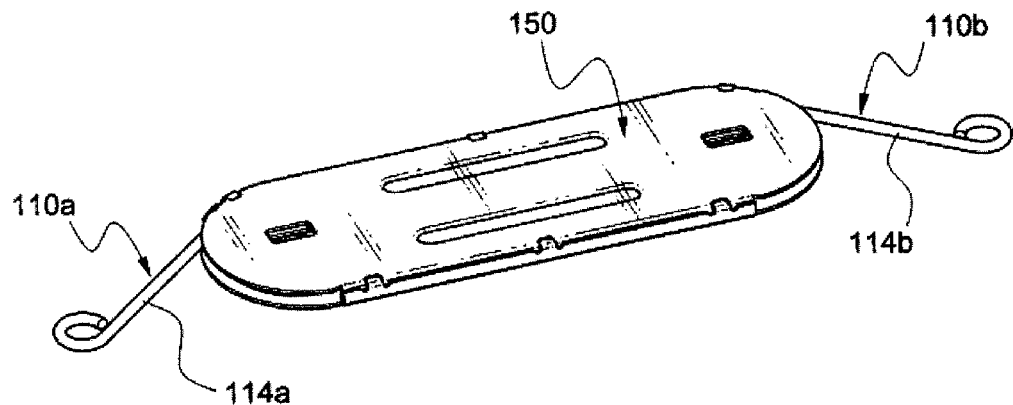
FIG. 37 is a perspective view illustrating another embodiment of an elastic device according to the present invention.
Figure 38:
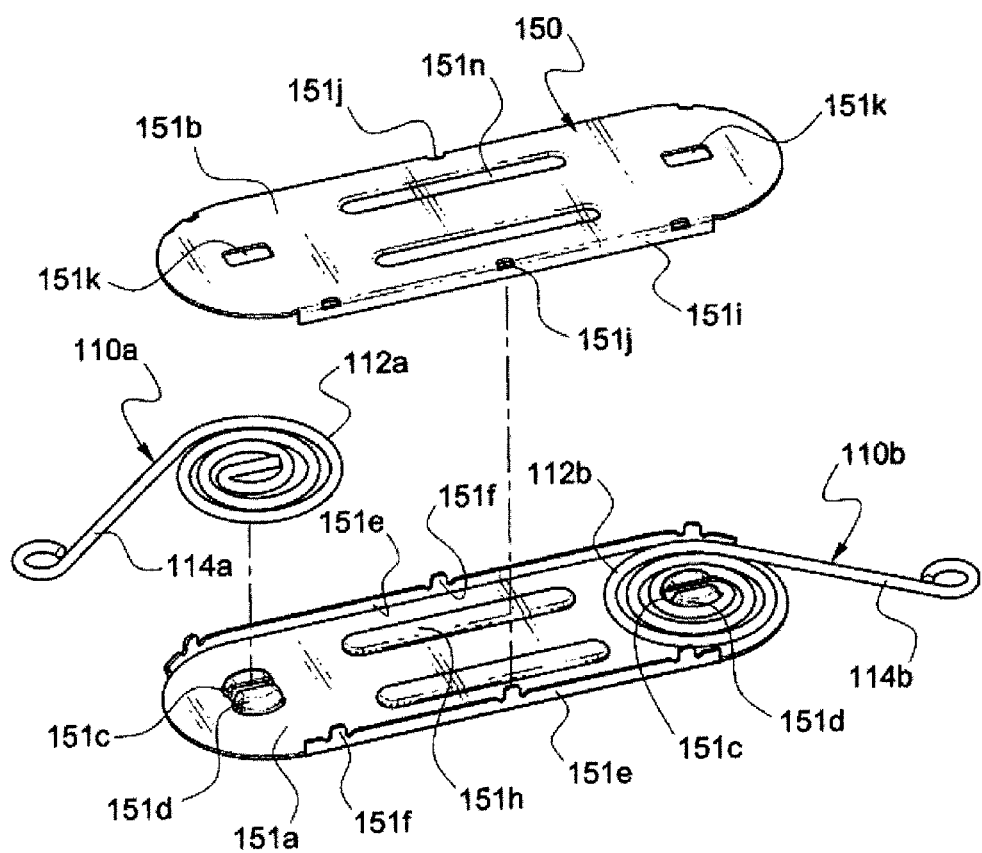
FIG. 38 is an exploded perspective view of the elastic device shown in FIG. 37.

FIG. 37 is a perspective view illustrating another embodiment of an elastic device according to the present invention, and FIG. 38 is an exploded perspective view of the elastic device shown in FIG. 37.

The first torsion spring 110a includes the first spiral part 112a and the first extension arm 114a, and the second torsion spring 110b includes the second spiral part 112b the second extension arm 114b.

A connection member 150 includes the first sheet member 151a and the second sheet member 151b, which face each other while having an interval for allowing each one end making a spiral shape of the first torsion spring 110a and the second torsion spring 110b to be disposed between them, so that the first torsion spring 110a and the second torsion spring 110b can be moved.

As shown, torsion spring coupling protrusions 151d are formed at both side portions of the first sheet member 150a. The torsion spring coupling protrusions 151d are formed at both sides of each of the gap holes 151c, into which outer ends of the first torsion spring 110a and the second torsion spring 110b can be inserted, respectively, in such a manner that the torsion spring coupling protrusions 151d are pressed to protrude toward an interior of the first sheet member 150a. Each of the outer ends of the first torsion spring 110a and the second torsion spring 110b are engaged with the corresponding gap holes 151c so as to be connected with the connection member 150, respectively.

The first rim 151e is formed in the first sheet member 151a at both sides along a longitudinal direction thereof while being curved toward the second sheet member 151b, except for a portion of the first sheet member 151a for allowing the first and second torsion springs 110a and 110b to move while rotating. Coupling protuberances 150f are formed on the first rim 151e at an interval.

The second rim 151i is formed in the second sheet member 151b at both sides along a longitudinal direction thereof while being curved toward the first sheet member 151a, except for a portion of the second sheet member 151b for allowing the first and second torsion springs 110a and 110b to be rotated. Coupling grooves 151j are formed at an interval in a lower part of the second rim 151j, which allow the coupling protuberances 151f to be curved and engaged therewith so as not to allow the first sheet member 151a and the second sheet member 151b to be separated from each other.

Gap holes 151k are formed in the second sheet member 151b while having a width larger than the gap 151c and larger enough to support both sides of an upper part of each of the torsion spring coupling protrusions 151d, respectively. It is preferable that the periphery portion of the gap hole 151k protrudes toward an interior of the second sheet member 151b. In such a case, the gaps 151c of the torsion spring coupling protrusions 151d do not become larger so that the torsion springs 110a and 110b can be supported. The upper parts of the torsion spring coupling protrusions 151d can be inserted into the gap holes 151k, respectively, so that the torsion spring coupling protrusions 151d can have a sufficiently high elevation.

As shown, pressed protrusions 151n and 151h are formed in the longitudinal direction of the first and second sheet members 151a and 151b, respectively, in such a manner that the pressed protrusions 151n and 151h protrude from exterior surfaces of the first and second sheet members 151a and 151b, respectively, toward each other at each position where the first and second torsion springs 110a and 110b are connected with each other. The pressed protrusions 151n and 151h increase the strength of the connection member 150 and stability of connection of the two sheet members.

As used herein, the torsion spring coupling protrusions 151d and the coupling protuberances 151f can be formed at the first sheet member 151a and the second sheet member 151b in such a manner that their positions are changed with each other.

Figure 39:
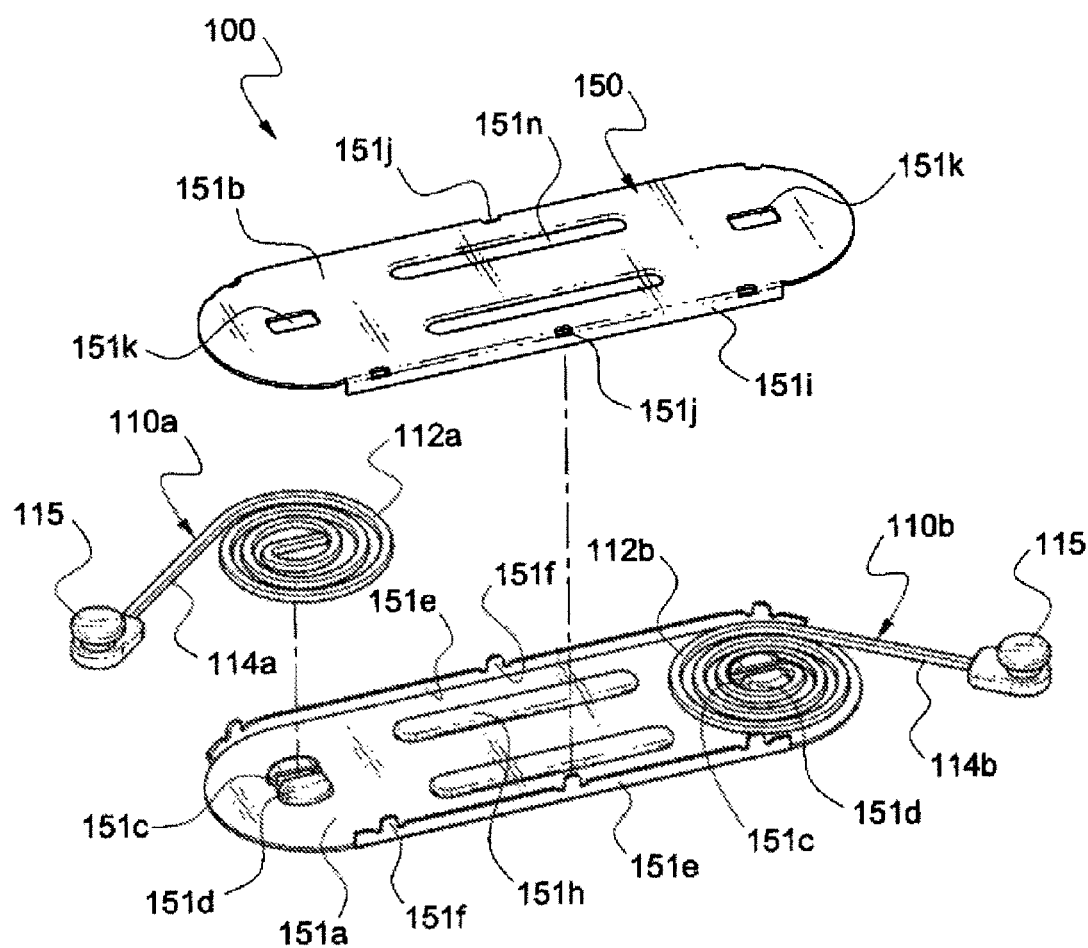
FIG. 39 is an exploded perspective view illustrating a modified embodiment of the elastic device shown in FIG. 38.

FIG. 39 is an exploded perspective view of the elastic device shown in FIG. 37.

As the case may be, each spring wire of the first and second torsion springs 110a and 110b can have a square-shaped section which is not a circular-shaped section. The first and second torsion springs 110a and 110b can be made in such a manner that hinge member 115s are molded to be inserted into ends of the first and second extension arms 114a and 114b of the first and second torsion springs 110a and 110b, respectively. The rest things are of the elastic device is the same what has been described in FIGS. 37 and 38.

Figure 40:
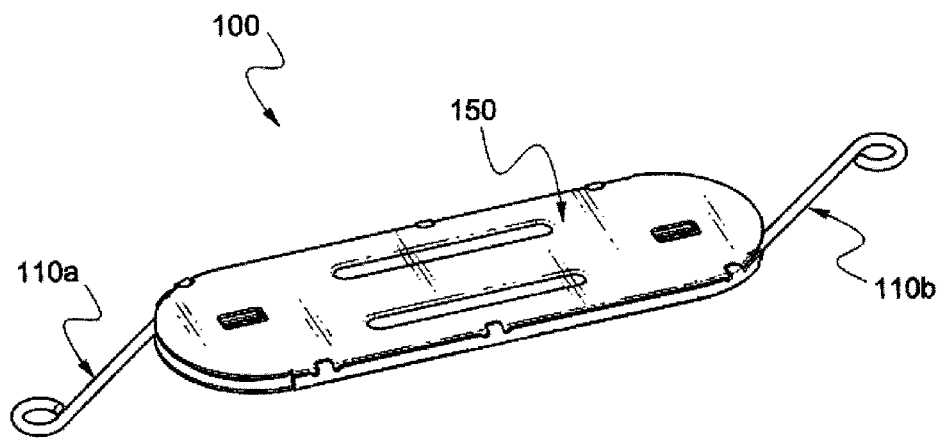
FIG. 40 is a perspective view illustrating a modified embodiment of the embodiment of the elastic device shown in FIG. 37.

FIG. 40 is a perspective view illustrating a modified embodiment the embodiment of the elastic device shown in FIG. 37.

As shown in FIG. 40, an elastic device 100 according to the present invention can includes the first torsion spring 110a and the second torsion spring 110b which have directions thereof opposite to each other. The rest things of the structure are equal to description through FIGS. 37 and 38.

Figure 41:
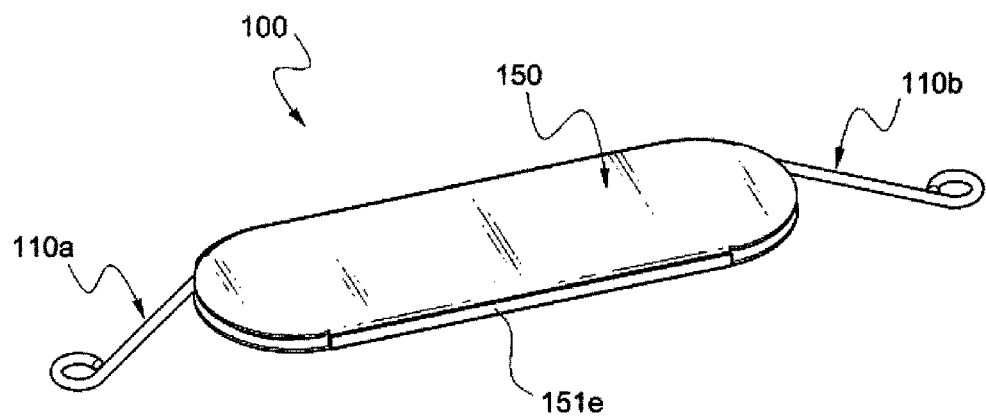
FIG. 41 is a perspective view illustrating another modified embodiment of the embodiment of the elastic device shown in FIG. 37.
Figure 42:
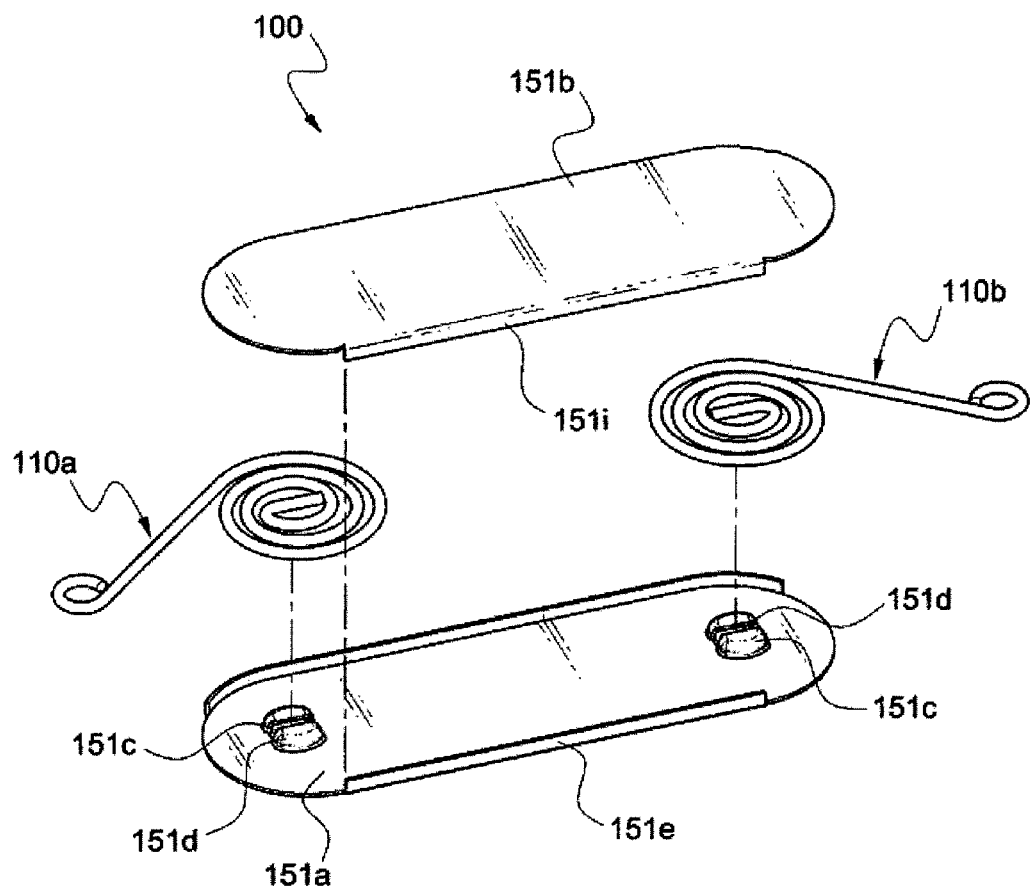
FIG. 42 is an exploded perspective view of the elastic device shown in FIG. 41.

FIG. 41 is a perspective view illustrating another modified embodiment of the embodiment of the elastic device shown in FIG. 37, and FIG. 42 is an exploded perspective view of the elastic device shown in FIG. 41.

The first torsion spring 110a and the second torsion spring 110b, which are shown in FIGS. 41, and 41 are equal to the description through FIGS. 37 and 38.

As shown, depending on each case, the first sheet member 151a and the second sheet member 151b can be connected with each other in such a manner that their contact portions thereof are point-welded by means of laser soldering, etc. in a state of them being assembled with each other while facing each other, without the coupling protuberances formed in the first rim 151e and the coupling grooves formed in a lower part of the second rim 151i, which have been described above.

When the first sheet member 151a and the second sheet member 151b are synthetic resins, they can be point-welded by high frequency bonding so as to be connected to each other.

As shown, the torsion spring coupling protrusions 151d are formed at both side portions of the first sheet member 150a. The torsion spring coupling protrusions 151d are formed at each both sides of gap holes 151c, into which outer ends positioned at a center of a spiral shape of the first torsion spring 110a and the second torsion spring 110b can be inserted, respectively, in such a manner that the torsion spring coupling protrusions 151d are pressed to protrude toward an interior of the first sheet member 150a. Each of the outer ends of the first torsion spring 110a and the second torsion spring 110b are engaged with the gap holes 151c so as to be connected with the connection member 150, respectively.

As shown, the second sheet member 151b may have a structure without a gap hole, different from the above-described embodiment.

Figure 43:
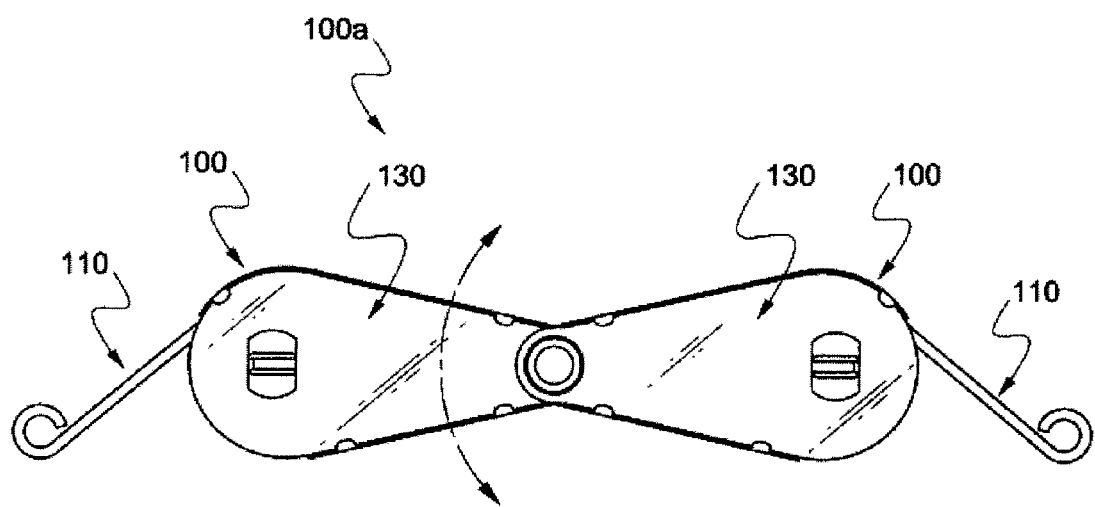
FIG. 43 is a plan view illustrating another embodiment of an elastic device according to the present invention.

FIG. 43 is a plan view illustrating another embodiment of an elastic device according to the present invention.

As the case may be, an elastic device according to the present invention can have a structure including a pair of elastic devices 100 as shown in FIG. 34 which are connected to each other through arm members. End portions of the arm member 130, which are opposite to the torsion springs 110, are coupled in such a manner that they can be rotated at a predetermined angle. In such a case, depending on a distance between two positions where each inner end located at the centers of a spiral shapes of the torsion springs 110 is connected with the arm member 130, there can be two divided areas of an area where elastic force can been acted and an area where elastic force can not been acted.

Of course, it is not necessary for the two elastic devices to be connected with each other through the ends of the arm member 130.

In the embodiments of the present invention described above, the first and second spiral parts and the first and second torsion springs can be formed of spring wires having diameters different from each other, i.e. they can be made while having heights different from each other, as the case may be.

In such a case, because elastic forces at left and right sides become different from each other, degrees of rotation or torsion in both the sides also become different from each other. Therefore, such a structure can be properly used where an arm member or an elastic arm in one of both sides needs to be firstly rotated or curved, or where an arm member or an elastic arm in one of both sides needs to be rotated or curved at a low degree. Furthermore, since it can be visually identified which one of arm members or elastic arms in both sides will be firstly rotated or curved, an easy assembling procedure thereof can be secured.

As described above, an elastic device according to the present invention includes a torsion spring wound by while making a spiral shape without a vertical overlapping portion thereof, and a sheet arm member or a connection member which are connected with the torsion spring, thereby having a smaller thickness compared with a conventional torsion spring having a vertical overlapping thereof. Accordingly, a sliding opening/closing apparatus according to the present invention, and a portable apparatus such a sliding phone, etc. in which such a sliding opening/closing apparatus according to the present invention is employed, can be slimmed.

An elastic device according to the present invention can be designed by adjusting a rotational angle formed when an extension arm is locked in a stopper, so that amount of elastic force caused by torsion moment of the elastic device is easily adjusted.

Also, in the present invention, since at least one end of a torsion spring is located at an interior positioned at a center of a spiral shape of a spiral part, winding times of the spiral part of the torsion spring can increased. Accordingly, lifecycles of the torsion spring, elastic device, and sliding opening/closing apparatus can be increased.

Furthermore, in a case where a steel wire having a diameter smaller than 0.45 mm is used in a conventional torsion spring because of a vertical overlapping portion thereof, force causing the torsion spring to be inverted by twist thereof is generated. Meanwhile, since an elastic device according to the present invention does not have a vertical overlapping portion thereof, although a torsion spring is made by using a steel wire having a relatively smaller diameter thereof such as a diameter of 0.35 mm or 0.3 mm, smaller than 0.45 mm, force causing the torsion spring to be inverted by twist thereof is not generated. Particularly, the elastic device according to the present and a sliding opening/closing apparatus using the same can have a very small thickness thereof.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An elastic device comprising:
    a torsion spring including a spiral part wound while making a spiral shape without a vertical overlapping portion of the spiral part;
    an arm member connected with the inner end of the spiral part, the arm member changing a degree of winding of the spiral part depending on a rotational angle with respect to the torsion spring and being provided with elastic force caused by torsion moment corresponding to the degree of winding of the spiral part,
    wherein the arm member is fixedly connected with the inner end of the spiral part and has a connection part for rotatably connecting with an associated member of the connection part, and
    wherein the arm member has a first sheet member and a second sheet member facing each other and one end of the torsion spring is located in an interval formed between the first sheet member and the second sheet member, the second sheet member being fixed to the first sheet member;
    a gap is formed at one of the first sheet member and the second sheet member so that one end of the torsion spring can be inserted into the gap, and a torsion spring connecting protrusion is formed at both sides of the gap in such a manner that the torsion spring connecting protrusion is pressed toward an interior so as to protrude; and
    one end or the other end of the torsion spring is engaged with the gap so as to be connected with the arm member.

2. The elastic device as claimed in claim 1, wherein the torsion spring includes a first spiral part and a second spiral part which are wound while making a spiral shape without a vertical overlapping portion, in which the first spiral part and the second spiral part being integrally formed in such a manner of each outer end of the first spiral part and the second spiral part being connected with each other, and has a first arm member connected with an inner end of the first spiral part and a second arm member connected with an inner end of the second spiral part.

3. The elastic device as claimed in claim 2, further comprising a connection member supporting one end of the first arm member connected with an inner end of the first spiral part and one end the second arm member connected with an inner end of the second spiral part so that the one end of the first arm member and the one end the second arm member can be rotated, the connection member connecting the first arm member and the second arm member with each other.

4. The elastic device as claimed in claim 3, wherein:
the connection member includes a first stopper and a second stopper for limiting rotational range of the first arm member and the second arm member; and
the first arm member and the second arm member includes a first latching jaw and a second latching jaw, respectively, which are locked into the stoppers so that rotational ranges of the first latching jaw and the second latching jaw are limited.

5. The elastic device as claimed in claim 3, wherein the connection member includes a torsion spring-seating recess including a first spiral part-seating recess for receiving the first spiral part and a second spiral part-seating recess for receiving the second spiral part.

6. The elastic device as claimed in claim 2, wherein the first arm member includes a first spiral part-seating recess for receiving the first spiral part and the second arm member includes a second spiral part-seating recess for receiving the second spiral part.

7. The elastic device as claimed in claim 1, wherein:
the spiral part including a first spiral part wound while making a spiral shape without a vertical overlapping portion, and a second spiral part wound while making a spiral shape without a vertical overlapping portion, the second spiral part being separated from the first spiral part and arranged side by side with the first spiral part on an equal plan;
the arm member includes a first are member connected with one end of the first spiral part and a second arm member connected with one end of the second spiral part;
the elastic device further comprises a connection member supporting one end of the first arm member connected with the first spiral part and one end of the second arm member connected with the second spiral part so that the one end of the first are member and the one end the second arm member can be rotated, the connection member connecting the first arm member and the second arm member with each other; and
the other end of the first spiral part and the other end of the second spiral part are held by the connection member.

8. The elastic device as claimed in claim 1, wherein the torsion spring may be made of a spring wire including a thickness-reduction part, the spring wire having a width larger than a thickness through a vertical pressing, cutting, or drawing.

9. The elastic device as claimed in claim 1, wherein multiple torsion springs are installed side by side in the arm member at an interval.

10. The elastic device as claimed in claim 1, wherein the torsion spring includes an extension arm extending from the outer portion of the spiral part to outside of the arm member.

11. The elastic device as claimed in claim 1, wherein the torsion spring connection protrusion is formed at one of the first sheet member and the second sheet member, and a gap hole is formed at the other sheet member, the gap hole having a width larger than a width of the gap so that the gap hole can support both sides of an upper part of the torsion spring connection protrusion so as to prevent the gap from becoming larger.

12. The elastic device as claimed in claim 1, wherein the elastic device may be a pair of elastic devices connected with each other through the arm member in such a manner as to be rotated at a predetermined angle.

13. An elastic device comprising:
a torsion spring including a spiral part wound while making a spiral shape without a vertical overlapping portion of the spiral part;
an arm member connected with the inner end of the spiral part, the arm member changing a degree of winding of the spiral part depending on a rotational angle with respect to the torsion spring and being provided with elastic force caused by torsion moment corresponding to the degree of winding of the spiral part,
wherein the arm member is fixedly connected with the inner end of the spiral part and has a connection part for rotatably connecting with an associated member of the connection part, and wherein:
a first sheet member and a second sheet member are assembled with each other while facing each other and having one end of the torsion spring between the first sheet member and the second sheet member;
a first rim is formed at the first sheet member in periphery of at least both sides of the first sheet member along a longitudinal direction of the arm member, among whole periphery of the first sheet member, except for periphery for allowing the torsion spring to be rotated, the first rim being curved toward the second sheet member, coupling protuberances being formed at an interval on the first rim; and
a second rim is formed at the second sheet member in periphery of at least both sides of the second sheet member along a longitudinal direction of the arm member, among periphery of the second sheet member, except for periphery for allowing the torsion spring to be rotated, the second rim being curved toward the first sheet member, coupling grooves being formed at an interval on a lower part of periphery of the second rim, the coupling protuberances being curved and engaged with the coupling grooves so as to enable the first sheet member and the second sheet member not to separated from each other.

14. An elastic device comprising:
a first torsion spring including a first spiral part wound toward an inner direction while making a spiral shape without a vertical overlapping portion and a first extension arm extending from an outer portion of the first spiral part;
a second torsion spring including a second spiral part wound while making a spiral shape without a vertical overlapping portion, the second spiral part being arranged side by side with the first spiral part, and a second extension arm extending from an outer portion of the second spiral part; and
a connection member connecting one of both ends of the first torsion spring and one of both ends of the second torsion spring with each other, wherein:
the connection member includes the first sheet member and the second sheet member which are assembled while facing each other at an interval and has one end of the first torsion spring and one end of the second torsion spring between the first sheet member and the second sheet member;

a gap is formed at one of the first sheet member and the second sheet member, so that one end of the first torsion spring and one end of the second torsion spring can be inserted into the gap, and a torsion spring connecting protrusion is formed at both sides of the gap in such a manner that the torsion spring connecting protrusion is pressed toward an interior so as to protrude; and one end or the other end of the first torsion spring and one end or the other end of the second torsion spring are engaged with the gap so as to be connected with the connection member.

15. The elastic device as claimed in claim 14, wherein the torsion spring connection protrusion is formed at one of the first sheet member and the second sheet member, and a gap hole is formed at the other sheet member, the gap hole having a width larger than a width of the gap so that the gap hole can support both sides of an upper part of the torsion spring connection protrusion so as to prevent the gap from becoming larger.

16. The elastic device as claimed in claim 14, wherein the first sheet member and the second sheet member are connected with each other by means of welding.

17. The elastic device as claimed in claim 14, wherein the pressed protrusions are formed at a position of the first sheet member or the second sheet member, in which the first torsion spring and the second torsion springs are connected with each other, the pressed protrusions protruding toward each other and increasing strength of the connection member and stability of connection of the two sheet members.

18. The elastic device as claimed in claim 14, wherein the connection member is connection with an inner end of the first spiral part and an inner end of the second spiral part, respectively.

19. The elastic device as claimed in claim 18, wherein the connection member includes a first torsion spring-seating recess for receiving the first spiral part and a second spiral part-seating recess for receiving the second spiral part.

20. The elastic device as claimed in claim 18, wherein a spiral part is further formed in at least one of the first extension arm and one end of the second extension arm, the spiral part being wound toward an interior of the spiral part without a vertical overlapping portion.

21. The elastic device as claimed in claim 14, wherein the connection member is connection with one end of the first spiral part and one end of the second spiral part, respectively.

22. The elastic device as claimed in claim 14, wherein the connection member is connection with an inner end of the first spiral part and the second extension arm, respectively.

23. The elastic device as claimed in claim 14, wherein the connection member has a thickness below two times thickness of the first torsion spring.

24. The elastic device as claimed in claim 14, wherein a thickness of the first torsion spring and a thickness of the second torsion spring are different from each other.

25. The elastic device as claimed in claim 14, wherein: connection recesses are formed at portions of the connection member, the first torsion spring and the second torsion spring being connected with each other at the portions, the connection recesses receiving connecting portions of the first torsion spring and the second torsion spring, respectively, so as to support the first torsion spring and the second torsion spring; and a stopper is formed at each of exposed portions of connection recesses, a stopper allowing the first extension arm and the second extension arm to extend outward and limiting rotational angle of the first extension arm and the second extension arm.

26. An elastic device comprising:

a first torsion spring including a first spiral part wound toward an inner direction while making a spiral shape without a vertical overlapping portion and a first extension arm extending from an outer portion of the first spiral part;

a second torsion spring including a second spiral part wound while making a spiral shape without a vertical overlapping portion, the second spiral part being arranged side by side with the first spiral part, and a second extension arm extending from an outer portion of the second spiral part; and a connection member connecting one of both ends of the first torsion spring and one of both ends of the second torsion spring with each other, wherein:

the connection member includes the first sheet member and the second sheet member which are assembled while facing each other at an interval and has one end of the first torsion spring and one end of the second torsion spring between the first sheet member and the second sheet member;

a first rim is formed at the first sheet member in periphery of at least both sides of the first sheet member along a longitudinal direction of the connection member, among whole periphery of the first sheet member except for periphery for allowing the first torsion spring and the second torsion spring to be rotated, the first rim being curved toward the second sheet member, coupling protuberances being formed at an interval on the first rim; and a second rim is formed at the second sheet member in periphery of at least both sides of the second sheet member along a longitudinal direction of the connection member, among whole periphery of the second sheet member except for periphery for allowing the first torsion spring and the second torsion spring to be rotated, the second rim being curved toward the first sheet member, coupling grooves being formed at an interval on a lower part of periphery of the second rim, the coupling protuberances being curved and engaged with the coupling grooves so as to enable the first sheet member and the second sheet member not to separated from each other.

* * * * *